(12) United States Patent
Soldati et al.

(10) Patent No.: US 10,178,557 B2
(45) Date of Patent: Jan. 8, 2019

(54) FIRST AND SECOND NETWORK NODES AND METHODS OF SPECTRUM SHARING

(71) Applicant: Huawei Technologies Co., Ltd., Shenzhen, Guangdong (CN)

(72) Inventors: Pablo Soldati, Kista (SE); George Koudouridis, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 15 days.

(21) Appl. No.: 15/646,916

(22) Filed: Jul. 11, 2017

(65) Prior Publication Data

US 2017/0359731 A1 Dec. 14, 2017

Related U.S. Application Data

(63) Continuation of application No. PCT/EP2015/050430, filed on Jan. 12, 2015.

(51) Int. Cl.
*H04W 16/14* (2009.01)
*H04W 28/16* (2009.01)
(Continued)

(52) U.S. Cl.
CPC ........... *H04W 16/14* (2013.01); *H04W 28/16* (2013.01); *H04W 72/042* (2013.01);
(Continued)

(58) Field of Classification Search
CPC ............. H04W 16/14; H04W 72/0453; H04W 72/0406; H04W 72/04; H04W 72/0433;
(Continued)

(56) References Cited

U.S. PATENT DOCUMENTS 9,866,499 B2 * 1/2018 Lee .................... H04L 12/2858
2006/0083205 A1 4/2006 Buddhikot et al.
(Continued)

FOREIGN PATENT DOCUMENTS

WO 2012040878 A1 4/2012
WO 2014194927 A1 12/2014

OTHER PUBLICATIONS

Kari Hooli et al., "WINNER Spectrum Aspects: Methods for Efficient Sharing, Flexible Spectrum Use and Coexistence", Information Society Technologies, Oct. 30, 2004, 88 pages.
(Continued)

*Primary Examiner* — Magdi Elhag

(57) ABSTRACT

A first network node and a second network node are disclosed. The first network node comprises a processor and a transceiver. The transceiver is configured to receive a first signal S1 comprising a network information message indicating network information associated with a first network operator in a region. The processor is configured to determine an allocation of frequency resources for operation $W_1$, for the first network operator or a second network operator in the region, based on the network information, and the processor is further configured to determine a density of network nodes for operation $\lambda_b$ or a frequency spectrum access price, for the first network operator or the second network operator, based on the network information. Corresponding methods, a computer program, and a computer program product are also disclosed.

16 Claims, 7 Drawing Sheets

(51) Int. Cl.
*H04W 72/04* (2009.01)
*H04W 24/02* (2009.01)

(52) U.S. Cl.
CPC ........ *H04W 72/0433* (2013.01); *H04W 24/02* (2013.01); *H04W 72/0453* (2013.01)

(58) Field of Classification Search
CPC ......... H04W 72/1215; H04W 72/0486; H04W 72/12
See application file for complete search history.

(56) References Cited

U.S. PATENT DOCUMENTS

| | | | | |
|---|---|---|---|---|
| 2013/0295926 A1* | 11/2013 | Michel | .............. | H04W 36/0061 455/434 |
| 2015/0289141 A1* | 10/2015 | Ghasemzadeh | ....... | H04W 16/14 370/330 |
| 2015/0358968 A1* | 12/2015 | Malladi | ................. | H04W 16/14 455/454 |
| 2017/0311295 A1* | 10/2017 | Soldati | ................. | H04W 16/10 |

OTHER PUBLICATIONS

Kejie Lu, et al., "Next generation Cognitive Cellular Networks: Spectrum Sharing and Trading", Guest Editorial in IEEE Wireless Communications, Apr. 2013, p. 10-11.

J. P. Kermoal et al., "Spectrum Sharing for WINNER Radio Access Networks", IEEE 1st International Conference on Cognitive Radio Oriented Wireless Networks and Communications, Jun. 2006, 5 pages.

Sanjay Kumar et al., "Spectrum Sharing for Next Generation Wireless Communication Networks", In the 1st IEEE workshop on Cognitive Radio and Advanced Spectrum Management, Feb. 14, 2008, 5 pages.

Sanjay Kumar et al., "Light Cognitive Radio Enabled Inter Operator Flexible Spectrum Usage for IMT-Advanced", Aalborg University, Dec. 10-12, 2009, 16 pages.

* cited by examiner

FIRST AND SECOND NETWORK NODES AND METHODS OF SPECTRUM SHARING

CROSS-REFERENCE TO RELATED APPLICATIONS

This application is a continuation of International Application No. PCT/EP2015/050430, filed on Jan. 12, 2015, the disclosure of which is hereby incorporated by reference in its entirety.

TECHNICAL FIELD

The present invention relates to a first network node and a second network node. Furthermore, the present invention also relates to corresponding methods, a computer program, and a computer program product.

BACKGROUND

Frequency spectrum allocation to mobile network operators is traditionally done in fixed an exclusive manner by government authorities. This often results in poor spectral efficiency as co-located network operators may have different spectrum needs over time and space depending on the distribution and mobility of the respective users and their traffic demand.

Spectrum sharing and dynamic spectrum allocation to mobile network operators have been advocated as a key feature to improve spectral efficiency already by the WINNER project for cognitive radio systems and radio access networks beyond 3G. Spectrum sharing and dynamic spectrum allocation have found renewed interest for future wireless communication systems, which are expected to enable new services and business opportunities for emerging stakeholders, leading to a large number of mobile network operators with co-located network deployments that cannot be accommodated by traditional static spectrum allocation rule is employed.

There are various alternative technologies related to spectrum sharing. One solution is to employ a Common Radio Resource Manager (CRRM) entity governing the spectrum usage of networks participating in spectrum sharing. This approach, often referred to as vertical sharing, requires the networks to share information related to the availability and usage of the respective radio resources such as transmission time, load, etc.

A drawback of the CRRM approach is that network operators sharing spectrum are required to share valuable (in some cases confidential) information of their networks. Additionally, the amount of signalling required to and from the CRRM may become significant depending on the spectrum sharing algorithm employed.

With a horizontal approach, network operators sharing spectrum obey pre-defined rules to trade, share or compete for spectrum resources without a common radio resource manager.

Another approach is to utilize geo-location databases (GLDB) to inform all network operators sharing spectrum about the free spectrum resources in a particular location. The database should incorporate information on sharing rules determined by the local spectrum administrator.

A drawback of solutions for horizontal spectrum sharing and GLDBs is that the rules for the co-existence are typically very general, causing the algorithm to converge to sub-optimal solutions compared to the CRRM approach with lower spectral efficiency.

Additionally, conventional solutions for dynamic spectrum sharing/allocation among co-located communication systems do not address the particular characteristic of ultra-dense network. In particular, in ultra-dense networks, the coupling between spectral efficiency and deployed network density can be exploited to optimize the trade-off between spectrum allocation and utilized network density in order to support a certain traffic demand.

SUMMARY

An objective of embodiments of the present invention is to provide a solution which mitigates or solves the drawbacks and problems of conventional solutions.

An "or" in this description and the corresponding claims is to be understood as a mathematical OR which covers "and" and "or", and is not to be understand as an XOR (exclusive OR).

The above objectives are solved by the subject matter of the independent claims. Further advantageous implementation forms of the present invention can be found in the dependent claims.

According to a first aspect of the invention, the above mentioned and other objectives are achieved with a first network node for a wireless communication system, the first network node comprising
 a processor, and
 a transceiver;
 wherein the transceiver is configured to receive a first signal S1 comprising a network information message indicating network information associated with a first network operator in a region;
 wherein the processor is configured to determine an allocation of frequency resources for operation $W_1$, for the first network operator or a second network operator in the region, based on the network information, and
 wherein the processor further is configured to determine a density of network nodes for operation $\lambda_b$ or a frequency spectrum access price, for the first network operator or the second network operator, based on the network information; and
 wherein the transceiver further is configured to transmit a second signal S2 to one or more second network nodes of the first network operator or the second network operator, the second signal S2 comprising a first network resource allocation message indicating the allocation of frequency resources for operation $W_1$, and the density of network nodes for operation $\lambda_b$ or the frequency spectrum access price.

A region in this disclosure should be understood as a geographical area wherein network nodes of the wireless communication system are deployed. The deployment of network nodes of a network operator in the communication system can be represented by a density of network nodes expressing, for instance, the number of network nodes per unit area present in a region of the wireless communication system. Therefore, different network operators can be characterized by different density of deployed network nodes as well as different density of network nodes for operation.

The expression "for operation" used in this disclosure in relation to an allocation of network resources should be understood as network resources allocated for the operation of the wireless communication system. In this regard, the density of network nodes for operation $\lambda_b$ represents number of network nodes per unit area that a network operator in the wireless communication system is configured to operate with in a region or sub-region. Similarly, an allocation of frequency resources for operation represents a set of frequency resources that network nodes of a network operator in a region or sub-region of the wireless communication systems are configured to operate with to serve the system users. An allocation of frequency resources may comprise either a continuous or discontinuous set of frequency resource units forming a frequency or spectrum band, or component carrier.

Moreover, the expression "operational state" in this disclosure should be understood as one or more operational modes that can be configured for a network node. One example of an operational state is a dormant mode (e.g. an OFF-state), wherein a network node has partially or fully disabled transmission or reception functionalities. A second example of operational state is an active mode (e.g., ON-state), wherein a network node is enabled with full transmission and reception capabilities. A third example of an operational state is reducing the transceiver duty cycle of the network node while in active mode by means of Discontinuous Reception (DRX) or Discontinuous Transmission (DTX) which define time periods when the receiver or the transmitter of the transceiver respectively can be turned off. An operational state may further refer to a state where a network node is configured to operate as a network control node for a region of the wireless communication system. For example, an access node being configured to control or coordinate the operation or radio resource allocation of other access nodes. Additionally, an operational state can refer to a transmission mode configurable for the network node, such as Single-Input-Single-Output (SISO) transmission, Multiple-Input-Multiple-Output (MIMO) transmission, multi-user MIMO transmission, massive MIMO transmission, etc. The related art LTE system offers, for instance, ten different transmission modes. An operational state can further refer to one or more radio access technologies that the network node may be configured to operate with, such as numerous releases of the related art LTE system, with several types of WiFi, device-to-device, etc. An operational state can additionally refer to a set of frequency resources that a network node can be configured to operate with, such as different frequency bands, component carriers, etc. An operational state can finally refer to communications features configurable for a network node, such as cooperative communication (e.g., Cooperative Multi-Point, CoMP), numerous types of interference coordination mechanisms, traffic adaptation mechanisms, etc.

A network node in this disclosure may denote a network control node or an access node or a combination thereof. The network nodes may communicate with each other and with other communication devices in a wireless manner through air-interfaces and/in a wired manner with wired connections. Examples of access nodes are Access Point (AP), Radio Base Station (RBS) or Base Transceiver Station (BTS). Examples of control nodes are Radio Network Controller (RNC), Radio Base Station (RBS) or Base Transceiver Station (BTS), which in some networks may be referred to as "eNB", "eNodeB", "NodeB" or "B node", depending on the technology and/or terminology used.

Further, a network operator or mobile network operator in this disclosure may denote a provider of services of wireless communications that owns and/or controls communication infrastructure necessary to sell and deliver services to an end user, including radio spectrum allocation, wireless network infrastructure, back haul, billing, etc. The network operator is in some cases referred to as "wireless service provider", "wireless carrier", "cellular company", or "mobile network carrier".

By determining parameters related to allocation of frequency resources for operation $W_1$ and a density of network nodes for operation $\lambda_b$, or a frequency spectrum access price for one or more network operators sharing frequency spectrum resources; and by transmitting a second signal comprising the determined parameters to one ore more network operator sharing frequency spectrum resources a number of advantages over conventional solutions are provided. Embodiments of the present invention further provide a solution for avoiding or mitigating the interference between network operators with co-located deployments of wireless communication systems by allocating the available frequency spectrum resources in a fair and dynamic manner and by optimizing the density of network nodes for operation of each network operator. Thereby, an advantage is that the trade-off between the number of access nodes and the frequency spectrum bandwidth utilized by each network operator in a geographical area is optimized while the corresponding traffic demand, quality of service, etc are satisfied. The present solution enables: minimization of operational costs, energy savings; interference mitigation; fair spectrum allocation. Therefore, the present first network node enables to dynamically reconfigure the allocation and utilization of radio resources to network nodes of network operators sharing frequency spectrum resources by adapting to time and spatial changes of traffic demand, service demands, user mobility patterns, etc. The present first network node further enables to optimize the efficiency of the wireless communication system of individual network operators thereby reducing the associated operational costs (OPEX).

In a first possible implementation form of a first network node according to the first aspect, the network information comprises one or more network traffic information or network environment information in the group comprising: traffic load, traffic demand, average traffic load or traffic demand, peak traffic load or traffic demand time distribution of traffic load or traffic demand, spatial distribution of traffic load or traffic demand, user device density, active user device density, traffic demand of active user devices, available density of network nodes, available frequency spectrum resources, and an estimate of a radio propagation loss exponent.

An advantage with this implementation form is to enable to control the allocation of frequency resources shared among multiple network operators, as well as the utilization of the network infrastructures in the corresponding wireless communication systems, based on the traffic load or traffic demand of each network operator. Therefore, a network operator with low traffic intensity in a region can be configured or allocated to serve its users with fewer network nodes or less frequency spectrum resources (e.g., frequency bandwidth), whereas a network operator with high traffic intensity or higher user device density in a region can be configured or allocated to serve its users with more network nodes or more frequency spectrum resources. Furthermore, two or more network operators with high traffic intensity in a region can be configured or allocated to serve its users with frequency spectrum resources (e.g., frequency bandwidth) proportional to their traffic load as compared to the total traffic load in the region. Such an implementation form results to a fair allocation of the frequency spectrum resources (e.g., frequency bandwidth) among the network operators.

In a second possible implementation form of a first network node according to the first implementation form of the first aspect or the first network node as such, the network information comprises one or more network resource utilization information in the group comprising: utilized frequency spectrum bandwidth, utilized frequency spectrum resources, an indication of scheduled network node density, an indication of interference associated to the available or utilized frequency resources, an indication of the operational cost per network nodes or per frequency spectrum unit, an indication of the energy cost per network nodes or per frequency spectrum unit, and indication or a preference of the resource costs to be minimized.

An advantage with this implementation form is that the allocation of frequency resources shared among multiple network operators can be adapted or controlled based on the available network resources (e.g., frequency resources or network nodes) that are utilized by each network operator. Therefore, the network resource utilization information provides a control feedback mechanism that enables to better control the allocation of shared frequency resources based, for instance, on the network resources available or already utilized by each network operator, their spectral efficiency, the operational cost, etc.

In a third possible implementation form of a first network node according to any of the preceding implementation forms of the first aspect or the first network node as such, the network information comprises one or more network identification information in the group comprising: network identifier, network role indication, spectrum management capabilities, network node capabilities, etiquette protocol capabilities, and etiquette protocol identifier.

The expression "etiquette protocol" in this disclosure may refer to a set of rules, a method, or an algorithm that network operators sharing a common pool of frequency resource can use to determine the allocation of shared frequency resources among the networks operators. An advantage with this implementation form is that the network identification information enables to identify the network information associated with different network operators so as to coordinate, control or adapt the allocation of shared frequency resources among multiple network operators based on said information. A further advantage with this implementation form is that a network operator is enabled to determine the proper etiquette protocol to use or used by other network operators sharing a common pool of frequency resources.

In a fourth possible implementation form of a first network node according to any of the preceding implementation forms of the first aspect or the first network node as such, the network information comprises one or more network resource request information in the group comprising: a request of frequency resources for operation $W_R$, a request of frequency spectrum bandwidth, one or more requested frequency bands, and a requested density of network nodes for operation $\lambda_R$.

An advantage with this implementation form is that the allocation of frequency resources shared among multiple network operators can be controlled or optimized based on an indication of the frequency resources requested by each network operator. Therefore, this implementation form enables semi-distributed and fully distributed solutions to share frequency spectrum resources among multiple network operators.

In a fifth possible implementation form of a first network node according to any of the preceding implementation forms of the first aspect or the first network node as such, the allocation of frequency resources for operation $W_1$ is associated with one or more in the group comprising: amount of frequency bandwidth, frequency location of frequency bandwidth, a set of time-frequency resource blocks, one or more frequency bands, instruction to increase or decrease frequency bandwidth, and instruction to increase or decrease frequency bandwidth by a predefined amount.

An advantage with this implementation form is to enable fast and dynamic adjustments of the frequency resources, such as the frequency bandwidth, utilized by second network nodes in a region or sub-region of the wireless communication system.

In a sixth possible implementation form of a first network node according to the fifth implementation form of the first aspect, the allocation of frequency resources for operation $W_1$ is exclusive for the first network operator; or the allocation of frequency resources for operation $W_1$ is non-exclusive for the first network operator.

An advantage with this implementation form is that a set of frequency resources can be allocated to a network operator for exclusive use or non-exclusive use, thereby enabling flexibility in the allocation of shared frequency resources to network operators with co-located wireless network systems in a region.

In a seventh possible implementation form of a first network node according to the sixth implementation form of the first aspect, the processor further is configured to use an etiquette operation protocol for determining the allocation of frequency resources for operation $W_1$ based on the network identification information or network resource request information.

An advantage with this implementation form is that signalling required for coordinating the allocation of frequency resources among network operators with co-located wireless communication systems in a region is minimized. A further advantage with this implementation form is that a network operator not only can determine the allocation of its own frequency resources, but also the allocation of other network operators thereby mitigating or avoiding further signalling among network operators.

In an eight possible implementation form of a first network node according to any of the preceding implementation forms of the first aspect or the first network node as such, the processor further is configured to determine an operational state for the one or more second network nodes based on the allocation of frequency resources for operation $W_1$ or the density of network nodes for operation $\lambda_b$; and wherein the first network resource allocation message further indicates the operational state for the one or more second network nodes.

An advantage with this implementation form is that since the operational state is determined by the first network node, the one or more second network nodes do not have to make the determination of the operational state. Thereby, a more centralized solution is provided which e.g. implies faster adaptation at the second network nodes, reduced computational capabilities needed in the second network nodes meaning less complex and cheaper second network nodes.

According to a second aspect of the invention, the above mentioned and other objectives are achieved with a second network node for a wireless communication system, the second network node comprising
  a processor, and
  a transceiver;
  wherein the transceiver is configured to receive a second signal S2 from a first network node, the second signal S2 comprising a first network resource allocation message at least indicating an allocation of frequency resources for operation $W_1$; and wherein the processor is configured to control the second network node based on the allocation of frequency resources for operation $W_1$.

The meaning of the processor being configured to control the second network node is that the second network node is configured or controlled to operate according to the first allocation of frequency resources for operation $W_1$, implying that the transceiver is configured to operate in the first allocation of frequency resources for operation $W_1$ or according to first allocation of frequency resources for operation $W_1$.

A second network node configured to receive the second signal S2 and control the second network node based on the allocation of frequency resources for operation $W_1$ in the second signal provides a number of advantages over conventional solutions.

An advantage is that the second network node, and accordingly a network operator (using the this second network node), can be dynamically reconfigured to operate with different frequency resources, such as frequency bands, set of time-frequency resource blocks, frequency spectrum bandwidth, etc., depending on the traffic demand or traffic load in a region. This enables to optimize the operation of the second network node and the corresponding network operator in the region, thereby reducing interference among co-located network operators, reducing energy costs for a network operator, and enhancing spectral efficiency. Hence, faster adaptation of the frequency resources utilized or allocated to a network operator is possible through a fast adaptation of the second network node. Further, interference between network operators with wireless communication systems co-located in a region can be reduced since the frequency use and/or re-use can be more efficiently coordinated with this solution.

In a first possible implementation form of a second network node according to the second aspect, the first network resource allocation message further indicates an operational state for one or more second network nodes, and wherein the processor further is configured to control the operational state of the second network node based on the operational state for the one or more second network nodes as indicated in the first network resource allocation message or based on the first allocation of frequency resources for operation $W_1$, or wherein the transceiver further is configured to transmit a third signal S3 to one or more other second network nodes, the third signal S3 comprising a second network resource allocation message indicating the operational state for the one or more second network nodes or the first allocation of frequency resources for operation $W_1$.

An advantage with this implementation form is that the allocation of network resources for second network nodes of a network operator can be dynamically reconfigured according to a network allocation message, thereby enabling to adapt the allocation of resources to time- and spatial changes in traffic patterns, traffic demand, service demands, user mobility patterns, etc. of the network operator.

In a second possible implementation form of a second network node according to the first implementation form of the second aspect or the second network node as such, the first network resource allocation message further indicates a density of network nodes for operation $\lambda_b$, and wherein the processor further is configured to control the second network node based on the allocation of frequency resources for operation $W_1$ or the density of network nodes for operation $\lambda_b$.

An advantage with this implementation form is that the allocation of network resources of a network operator, including the density of network nodes for operation and the allocation of frequency resources for operation, can be dynamically reconfigured according to a network allocation message received by a second network node of the network operator. Thereby, the allocation of network resources for a network operator can be adapted to time- and spatial changes in traffic patterns of the network operator, service demands, user mobility patterns, etc.

In a third possible implementation form of a second network node according to any of the preceding implementation forms of the second aspect or the second network node as such, the first network resource allocation message further indicates a spectrum access price, and wherein the processor is further configured to determine a request of frequency resources for operation $W_R$ or a requested density of network nodes for operation $\lambda_R$ based on the spectrum access price, and wherein the transceiver further is configured to transmit a first signal S1 to the first network node, the first signal S1 comprising a network information message indicating the requested frequency resources for operation $W_R$ or a requested density of network nodes for operation $\lambda_R$.

An advantage with this implementation form is that distributed or partially distributed solutions to frequency spectrum sharing among network operators of wireless communication systems co-located in a region are enabled. An additional advantage is that the enabled solutions to spectrum sharing can be implemented without an explicit signalling exchange between network operators. A further advantage is that the enabled solutions to spectrum sharing can be implemented by signalling a request of frequency resources from at least a network operator in the form of a second network node, without exchanging any confidential or proprietary information associated to the corresponding wireless communication system.

In a fourth possible implementation form of a second network node according to the third implementation form of the second aspect, the requested frequency resources for operation $W_R$ comprises one or more in the group comprising: a requested frequency spectrum bandwidth, one or more requested frequency bands, and a set of requested time-frequency resource blocks.

An advantage with this implementation form is that solutions to spectrum sharing are enabled by signalling a request of frequency resources from at least a network operator in the form of a second network node, without exchanging any confidential or proprietary information associated to the corresponding wireless communication system.

In a fifth possible implementation form of a second network node according to any of the preceding implementation forms of the second aspect or the second network node as such, wherein the transceiver further is configured to receive a fourth signal S4 comprising a network information message indicating network information associated with a first network operator; wherein the processor is further configured determine a density of network nodes for operation $\lambda_b$ based on the network information, wherein the processor is further configured to determine an operational state, for the second network node or one or more other second network nodes, based on the first network resource allocation message and the density of network nodes for operation $\lambda_b$, wherein the transceiver further is configured to transmit a third signal S3 to the one or more other second network nodes, the third signal S3 comprising a second network resource allocation message indicating the operational state for the one or more other second network nodes and the first allocation of frequency resources for operation $W_1$.

An advantage with this implementation form is that fully distributed solutions to spectrum sharing among network operators of wireless communication systems co-located in a region are possible. A further advantage of this implementation form is that a network operator is enabled to adapt and optimize the density of network nodes for operation in the corresponding wireless communication system, as well as the operational state of the corresponding network nodes, based on a network information message associated with a network operator. Thereby, operational costs (e.g., CAPEX) or energy costs can be minimized.

In a sixth possible implementation form of a second network node according to any of the preceding implementation forms of the second aspect or the second network node as such, the transceiver further is configured to transmit a first signal S1 to the first network node, the first signal S1 comprising a network information message indicating network information associated with a network operator of the wireless communication system.

An advantage with this implementation form is that solutions to spectrum sharing among network operators of wireless communication systems co-located in a region are possible with reduced signalling.

In a seventh possible implementation form of a second network node according to any of the preceding implementation forms of the second aspect or the second network node as such, the network information is one or more network traffic information or network environment information in the group comprising: traffic load, traffic demand, average traffic load or traffic demand, peak traffic load or traffic demand, time distribution of traffic load or traffic demand, spatial distribution of traffic load or traffic demand, user device density, active user device density, traffic demand of active user devices, available density of network nodes, available frequency spectrum resources, and an estimate of a radio propagation loss exponent.

An advantage with this implementation form is to enable a second network node to signal network information associated with a network operator to a first network node so as to enable solutions for spectrum sharing among network operators of wireless communication systems co-located in a region.

In an eight possible implementation form of a second network node according to any of the preceding implementation forms of the second aspect or the second network node as such, wherein the network information is one or more network resource utilization information in the group comprising: utilized frequency spectrum bandwidth, utilized frequency spectrum resources, an indication of scheduled network node density, an indication of interference associated to the available or utilized frequency resources, an indication of the operational cost per network nodes or per frequency spectrum unit, an indication of the energy cost per network nodes or per frequency spectrum unit, and indication or a preference of the resource costs to be minimized.

An advantage with this implementation form is that the allocation of frequency resources shared among network operators of wireless communication system co-located in a region can be adapted or controlled based on how the available network resources are utilized by each network operator. Therefore, this information provides a control feedback mechanism that enables to better control the allocation of shared frequency resources based, for instance, on the network resources available or already utilized by each network operator, their spectral efficiency, the operational cost, etc.

According to a third aspect of the invention, the above mentioned and other objectives are achieved with a method in a wireless communication system, the method comprising receiving a first signal S1 comprising a network information message indicating network information associated with a first network operator in a region; determining an allocation of frequency resources for operation $W_1$, for the first network operator or a second network operator in the region, based on the network information, and determining a density of network nodes for operation $\lambda_b$ or a frequency spectrum access price, for the first network operator or the second network operator, based on the network information; and transmitting a second signal S2 to one or more second network nodes of the first network operator or the second network operator, the second signal S2 comprising a first network resource allocation message indicating the allocation of frequency resources for operation $W_1$, and the density of network nodes for operation $\lambda_b$ or the frequency spectrum access price.

In a first possible implementation form of a method according to the third aspect, the network information comprises one or more network traffic information or network environment information in the group comprising: traffic load, traffic demand, average traffic load or traffic demand, peak traffic load or traffic demand time distribution of traffic load or traffic demand, spatial distribution of traffic load or traffic demand, user device density, active user device density, traffic demand of active user devices, available density of network nodes, available frequency spectrum resources, and an estimate of a radio propagation loss exponent.

In a second possible implementation form of a method according to the first implementation form of the third aspect or the method as such, the network information comprises one or more network resource utilization information in the group comprising: utilized frequency spectrum bandwidth, utilized frequency spectrum resources, an indication of scheduled network node density, an indication of interference associated to the available or utilized frequency resources, an indication of the operational cost per network nodes or per frequency spectrum unit, an indication of the energy cost per network nodes or per frequency spectrum unit, and indication or a preference of the resource costs to be minimized.

In a third possible implementation form of a method according to any of the preceding implementation forms of the third aspect or the method as such, the network information comprises one or more network identification information in the group comprising: network identifier, network role indication, spectrum management capabilities, network node capabilities, etiquette protocol capabilities, and etiquette protocol identifier.

In a fourth possible implementation form of a method according to any of the preceding implementation forms of the third aspect or the method as such, the network information comprises one or more network resource request information in the group comprising: a request of frequency resources for operation $W_R$, a request of frequency spectrum bandwidth, one or more requested frequency bands, and a requested density of network nodes for operation $\lambda_R$.

In a fifth possible implementation form of a method according to any of the preceding implementation forms of the third aspect or the method as such, the allocation of frequency resources for operation $W_1$ is associated with one or more in the group comprising: amount of frequency bandwidth, frequency location of frequency bandwidth, a set of time-frequency resource blocks, one or more frequency bands, instruction to increase or decrease frequency bandwidth, and instruction to increase or decrease frequency bandwidth by a predefined amount.

In a sixth possible implementation form of a method according to the fifth implementation form of the third aspect, the allocation of frequency resources for operation $W_1$ is exclusive for the first network operator; or the allocation of frequency resources for operation $W_1$ is non-exclusive for the first network operator.

In a seventh possible implementation form of a method according to the sixth implementation form of the third aspect, the method further comprises using an etiquette operation protocol for determining the allocation of frequency resources for operation $W_1$ based on the network identification information or network resource request information.

In an eight possible implementation form of a method according to any of the preceding implementation forms of the third aspect or the method as such, the method further comprises determining an operational state for the one or more second network nodes based on the allocation of frequency resources for operation $W_1$ or the density of network nodes for operation $\lambda_b$; and wherein the first network resource allocation message further indicates the operational state for the one or more second network nodes.

According to a fourth aspect of the invention, the above mentioned and other objectives are achieved with a method in a wireless communication system, the method comprising receiving a second signal S2 from a first network node, the second signal S2 comprising a first network resource allocation message at least indicating an allocation of frequency resources for operation $W_1$; and controlling the second network node based on the allocation of frequency resources for operation $W_1$.

In a first possible implementation form of a method according to the fourth aspect, the first network resource allocation message further indicates an operational state for one or more second network nodes, and the method further comprises controlling the operational state of the second network node based on the operational state for the one or more second network nodes as indicated in the first network resource allocation message or based on the first allocation of frequency resources for operation $W_1$, or transmitting a third signal S3 to one or more other second network nodes, the third signal S3 comprising a second network resource allocation message indicating the operational state for the one or more second network nodes or the first allocation of frequency resources for operation $W_1$.

In a second possible implementation form of a method according to the first implementation form of the fourth aspect or the method as such, the first network resource allocation message further indicates a density of network nodes for operation $\lambda_b$, and the method further comprises controlling the second network node based on the allocation of frequency resources for operation $W_1$ or the density of network nodes for operation $\lambda_b$.

In a third possible implementation form of a method according to any of the preceding implementation forms of the fourth aspect or the method as such, the first network resource allocation message further indicates a spectrum access price, and the method further comprises determining a request of frequency resources for operation $W_R$ or a requested density of network nodes for operation $\lambda_R$ based on the spectrum access price, and transmitting a first signal S1 to the first network node, the first signal S1 comprising a network information message indicating the requested frequency resources for operation $W_R$ or a requested density of network nodes for operation $\lambda_R$.

In a fourth possible implementation form of a method according to the third implementation form of the fourth aspect, the requested frequency resources for operation $W_R$ comprises one or more in the group comprising: a requested frequency spectrum bandwidth, one or more requested frequency bands, and a set of requested time-frequency resource blocks.

In a fifth possible implementation form of a method according to any of the preceding implementation forms of the fourth aspect or the method as such, wherein the method further comprises receiving a fourth signal S4 comprising a network information message indicating network information associated with a first network operator; determining a density of network nodes for operation $\lambda_b$ based on the network information, determining an operational state, for the second network node or one or more other second network nodes, based on the first network resource allocation message and the density of network nodes for operation $\lambda_b$, transmitting a third signal S3 to the one or more other second network nodes, the third signal S3 comprising a second network resource allocation message indicating the operational state for the one or more other second network nodes and the first allocation of frequency resources for operation $W_1$.

In a sixth possible implementation form of a method according to any of the preceding implementation forms of the fourth aspect or the method as such, the method further comprises transmitting a first signal S1 to the first network node, the first signal S1 comprising a network information message indicating network information associated with a network operator of the wireless communication system.

In a seventh possible implementation form of a method according to any of the preceding implementation forms of the fourth aspect or the method as such, the network information is one or more network traffic information or network environment information in the group comprising: traffic load, traffic demand, average traffic load or traffic demand, peak traffic load or traffic demand, time distribution of traffic load or traffic demand, spatial distribution of traffic load or traffic demand, user device density, active user device density, traffic demand of active user devices, available density of network nodes, available frequency spectrum resources, and an estimate of a radio propagation loss exponent.

In an eight possible implementation form of a method according to any of the preceding implementation forms of the fourth aspect or the method as such, wherein the network information is one or more network resource utilization information in the group comprising: utilized frequency spectrum bandwidth, utilized frequency spectrum resources, an indication of scheduled network node density, an indication of interference associated to the available or utilized frequency resources, an indication of the operational cost per network nodes or per frequency spectrum unit, an indication of the energy cost per network nodes or per frequency spectrum unit, and indication or a preference of the resource costs to be minimized.

The advantages of the methods according to the third aspect or the fourth aspect are the same as those for the corresponding device claims according to the first and second aspects.

According to a fifth aspect of the present invention, the above mentioned and other objectives are achieved with a wireless communication system comprising a first plurality of network nodes associated with a first network operator, the first plurality of network nodes comprising at least one first network node according to the first aspect, and a second plurality of network nodes associated with a second network operator, the second plurality of network nodes comprising at least one second network node according to the second aspect; wherein the first plurality of network nodes associated with the first network operator and the second plurality of network nodes associated with the second network operator are co-located in a region and are configured to share frequency resources in the region.

The present invention also relates to a computer program, characterized in code means, which when run by processing means causes said processing means to execute any method according to the present invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the present invention will be apparent from the following detailed description.

BRIEF DESCRIPTION OF THE DRAWINGS

The appended drawings are intended to clarify and explain different embodiments of the present invention, in which.

DETAILED DESCRIPTION

Figure 1:
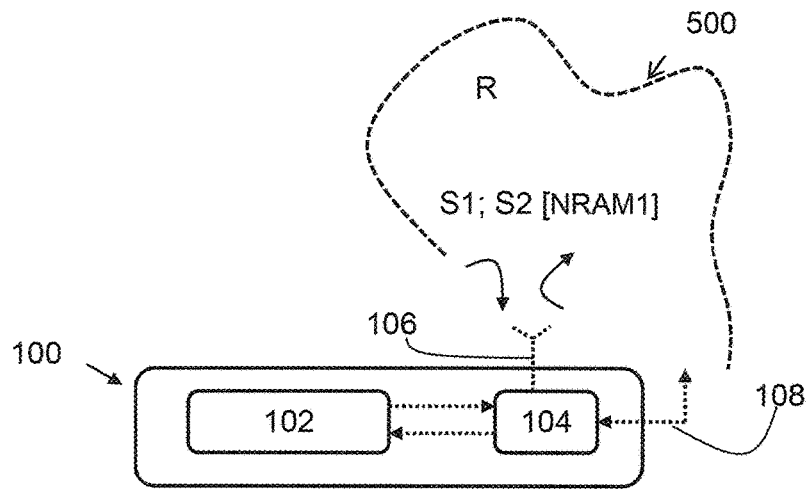
FIG. 1 shows a first network node according to an embodiment of the present invention.

Frequency spectrum sharing can be classified as either contention-based or contention-free, with either exclusive or non-exclusive allocation or access to frequency spectrum resources. In contention-based methods, such as online spectrum auctioning or horizontal spectrum sharing, multiple network operators compete according to pre-defined rules to access certain portions of the frequency spectrum. In this case a third-party regulatory entity may be involved. With contention-free methods, the spectrum access is either regulated by a supervisory entity (i.e. a centralized solution) or by coordinating/cooperative methods among the network operators, i.e. a distributed solution. Distributed solutions may refer to solutions where the determination of the allocation of network resources, such as frequency resources or network nodes for operation, is performed by network nodes of network operators; whereas partial distributed solutions may refer to semi-distributed solutions where the determination of the allocation of network resources is coordinated by an impartial network control node such as a $3^{rd}$ party spectrum manager.

With exclusive spectrum allocation, each network operator is granted exclusive access to a portion of the spectrum for a given amount of time. The difference with traditional exclusive spectrum usage is that the spectrum allocation is not fixed over time, but may last for a time window spanning from milliseconds (dynamic allocation) to days or months (semi-permanent allocation). With non-exclusive spectrum allocation, two or more network operators may be allocated to overlapping portions of frequency spectrum.

Regardless of the particular spectrum sharing or spectrum allocation methodology, the allocation method can be based on instantaneous spectrum needs of the network operators, such as the corresponding network load, traffic demand, type of traffic, etc., as well as on interference tolerance of the networks (in case of non-exclusive allocation), the out-of-band characteristics of the network nodes, etc. However, in ultra-dense networks the allocation should take into account the density as well as the locations of various network nodes.

It is herein considered N>1 network operators n=1, ..., N of densely deployed wireless communication system coexisting (co-located) in a geographical area (or region) and sharing a common pool of frequency spectrum resources. Let $\lambda_{n,dep}$ denote the density of the network nodes per area unit deployed by each network operator n=1, ..., N, and $\lambda_{n,b}$ denote the density of network nodes for operation of a network operator n=1, ..., N. Without ambiguity, we shall use the short-hand notation $\lambda_b$ instead of $\lambda_{n,b}$ when it is clear from the context that the density network nodes for operation is associated to a network operator n=1, ..., N. Furthermore, we let W denote the available frequency spectrum resource, which may comprise several adjacent or disjoint frequency resource units (e.g. frequency bands).

Embodiments of the present invention relates to a first network node, a second network node and to a wireless communication system comprising such network nodes. Also corresponding methods are considered.

FIG. 1 shows an embodiment of a first network node 100 according to the present invention. The first network node 100 comprises a processor 102 and a transceiver 104. The transceiver 104 is in this particular example coupled to an antenna unit 106 (dashed lines) for wireless communication and/or a wired connection 108 (dashed lines) for wired communication. The transceiver 104 is configured to receive a first signal S1 comprising a network information message associated with a first network operator in a region R. The first signal S1 is in this particular embodiment received by means of the antenna unit 106 and/or the wired communication connection 108 but is not limited thereof.

The transceiver 104 of the first network node 100 is further configured to forward the received network information message to the processor 102. Hence, the processor 102 and the transceiver 104 are communicably coupled to each other with suitable communication means such as known in the art. The communication means are illustrated with the two arrows between the processor 102 and the transceiver 104 in FIG. 1.

The processor 102 of the first network node 100 is configured to receive the network information message and configured to determine an allocation of frequency resources for operation $W_1$ for the first network operator or for another second network operator in the region R. The processor 102 is further configured to determine a density of network nodes for operation $\lambda_b$ and/or a frequency spectrum access price for the first network operator or the second network operator. The density of network nodes for operation $\lambda_b$ and the frequency spectrum access price are also determined based on the received network information.

The transceiver 104 is further configured to transmit a second signal S2 to one or more second network nodes of the first network operator or the second network operator. The second signal S2 comprises a first network resource allocation message NRAM1 indicating the allocation of frequency resources for operation $W_1$, and the density of network nodes for operation $\lambda_b$ and/or the frequency spectrum access price.

Figure 2:
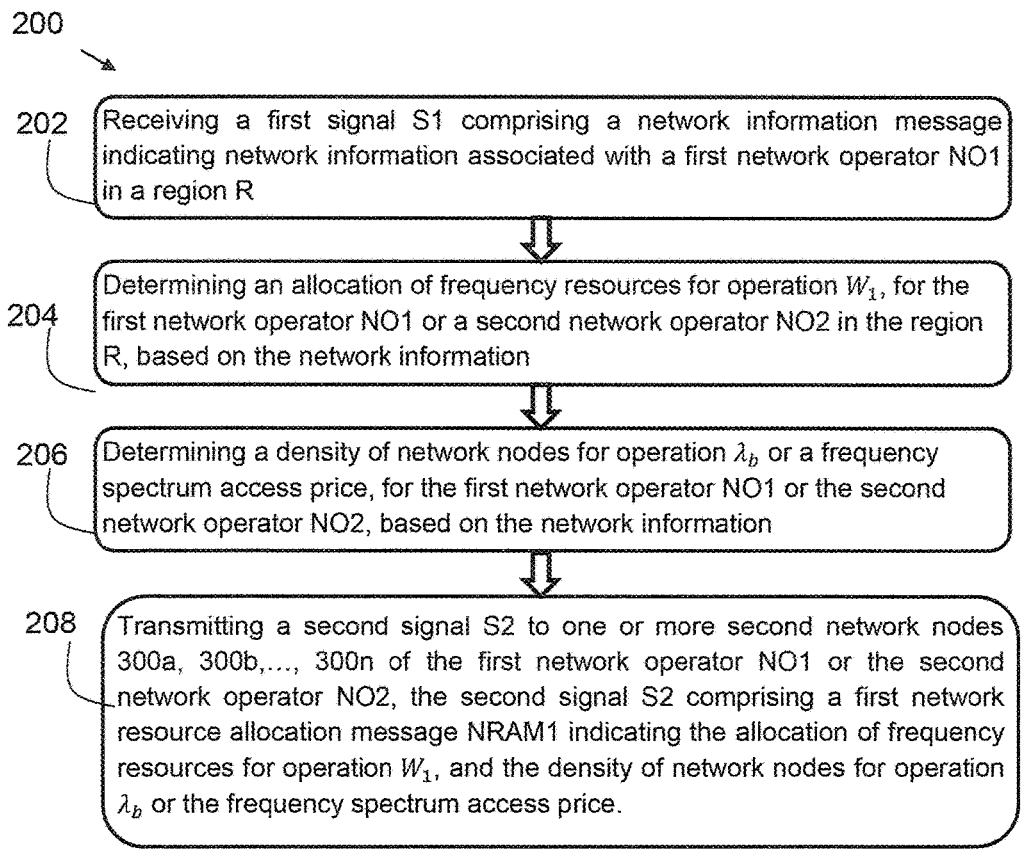
FIG. 2 shows a method according to an embodiment of the present invention.

FIG. 2 shows a corresponding method 200 which in this particular embodiment is executed in a first network node 100 such as the one shown in FIG. 1. The method 200 comprises the step 202 of receiving a first signal S1 comprising a network information message indicating network information associated with a first network operator NO1 in a region R. The method 200 further comprises the step 204 of determining an allocation of frequency resources for operation $W_1$ based on the network information. The allocation of frequency resources for operation $W_1$ is for the first network operator NO1 or a second network operator NO2 in the region R. The method 200 further comprises the step 206 of determining a density of network nodes for operation $\lambda_b$ and/or a frequency spectrum access price based on the network information, which are also for the first network operator NO1 or the second network operator NO2. The method 200 further comprises the step 208 of transmitting a second signal S2 to one or more second network nodes of the first network operator NO1 or the second network operator NO2. The second signal S2 comprises a first network resource allocation message NRAM1 indicating the allocation of frequency resources for operation $W_1$. The second signal S2 further comprises the density of network nodes for operation $\lambda_b$ and/or the frequency spectrum access price depending on the application.

The first network node 100 may be a spectrum manager (SM) node or a network control node of a radio access network according to an embodiment. A spectrum manager node is a logical supervisory entity that coordinates or determines the radio resource allocation for a plurality of network operators (see FIG. 7(a)). In this embodiment, an implicit hierarchical structure can be assumed between the first network node 100 and the second network node 300 (see FIGS. 3 and 4 in regard of the second network node 300), with the first network node 100 being a super-partes spectrum manager, whilst the second network node 300 being a network control node either in the core or the radio access network owned by a network operator. In alternative, the first network node 100 may be a network control node of a network operator (see FIG. 7(b)). In this embodiment, a network control node of a network operator acts as first network node with respect to the allocation of frequency resources and network node density of the associated network operator, whereas the first network node 100 acts as second network node with respect to a network control node of a second network operator. Therefore, different network operators may coordinate, share, or trade the allocation of network resources through the respective network control nodes in a distributed or peer-to-peer fashion.

The density of network nodes for operation $\lambda_b$ of a network operator represents the number of network nodes scheduled to be used per unit area in a region of the wireless communication system 500 to meet the traffic demand of the user devices present in the region. Hence, a network operator receives from the first network node 100 an indication of how many radio network nodes to use in a region of the wireless communication system. While the density of network nodes scheduled for operation may represent a ratio of ON-OFF network nodes in a geographical area for a relatively long period of time, a network operator can control the ON-OFF switching of the network nodes on a fast time scale, so as to follow dynamic changes in traffic demand, user mobility patterns, interference variations, etc.

Figure 3:
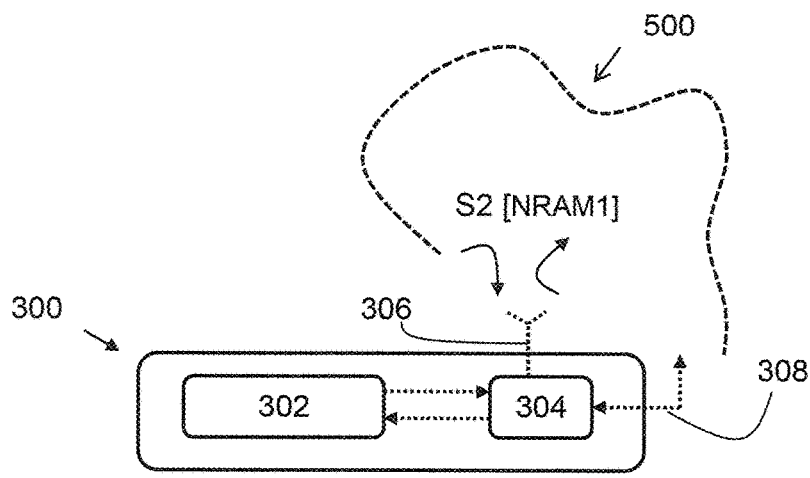
FIG. 3 shows a second network node according to an embodiment of the present invention.

FIG. 3 shows an embodiment of a second network node 300 according to the present invention. The second network node 300 comprises a processor 302 and a transceiver 304. The transceiver 304 is also in this particular example coupled to an antenna unit 306 (dashed lines) for wireless communication and/or a wired connection 308 (dashed lines) for wired communication. The transceiver 304 is configured to receive a second signal S2 which comprises a first network resource allocation message NRAM1 that at least indicates an allocation of frequency resources for operation $W_1$. However, according to further embodiments the first network resource allocation message NRAM1 may further indicate a density of network nodes for operation $\lambda_b$ and/or a frequency spectrum access price and/or an operational state for one or more second network nodes depending on the application. The second signal S2 is in this particular embodiment received by means of the antenna unit 306 and/or the wired communication connection 308. The processor 302 of the second network node 300 is configured to receive the allocation of frequency resources for operation $W_1$ and is further configured to control the second network node 300 based on the allocation of frequency resources for operation $W_1$. Furthermore, the processor 302 may configured to control the second network node 300 based density of network nodes for operation $\lambda_b$ and/or a frequency spectrum access price and/or an operational state for the second network node 300, as indicated in the first network resource allocation message NRAM1.

Figure 4:
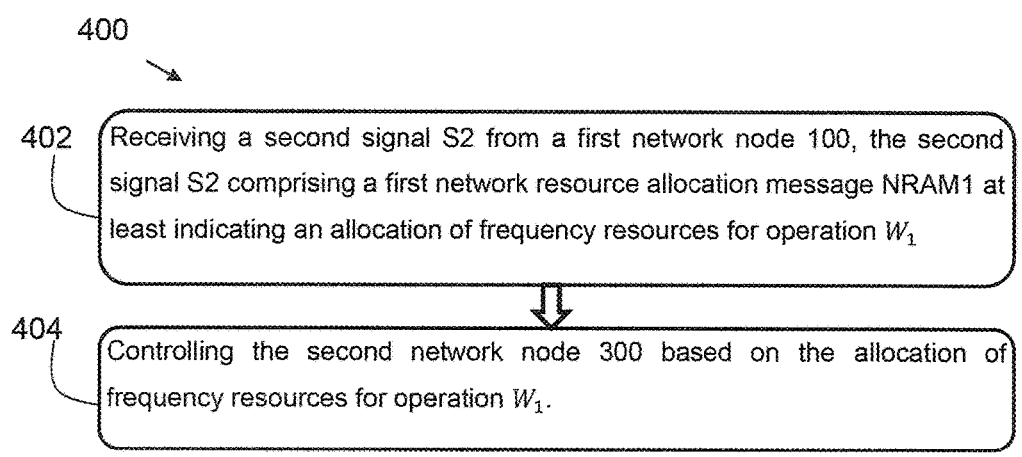
FIG. 4 shows a further method according to a further embodiment of the present invention.

FIG. 4 shows a corresponding method 400 which in this particular embodiment is executed in a second network node 300 such as the one shown in FIG. 3. The method 400 comprises the step 402 of receiving a second signal S2 from a first network node 100. The second signal S2 comprises a first network resource allocation message NRAM1 which at least indicates an allocation of frequency resources for operation $W_1$. The method 400 further comprises the step 404 of controlling 404 the second network node 300 based on the allocation of frequency resources for operation $W_1$.

Figure 5:
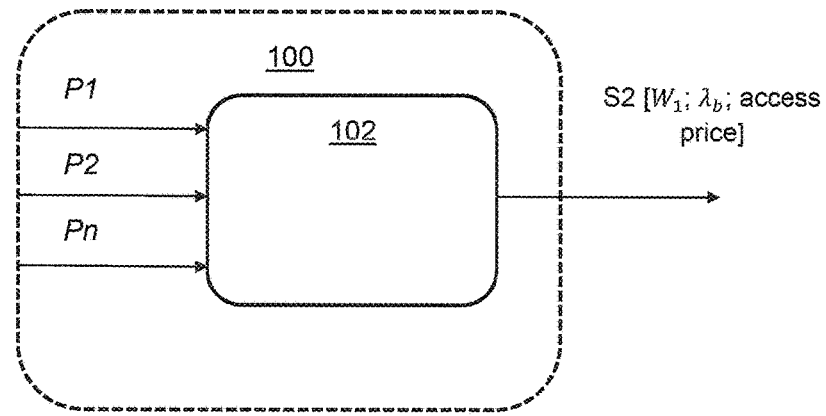
FIG. 5 illustrates a further first network node according to a further embodiment of the present invention.

FIG. 5 shows a further embodiment of a first network node 100 according to the present invention in which an allocation of frequency resources for operation $W_1$ is determined by the processor 102 based on the received network information. The processor also determines a density of network nodes for operation $\lambda_b$ and/or a frequency spectrum access price. FIG. 5 further shows how the first network resource allocation message NRAM1 in the second signal S2 indicates one or more of the first allocation of frequency resources for operation $W_1$, the density of network nodes for operation $\lambda_b$ and the frequency spectrum access price.

According to an embodiment of the present invention the first allocation of frequency resources for operation $W_1$ indicates one or more in the group comprising: amount of frequency bandwidth, frequency location of frequency bandwidth, a set of time-frequency resource blocks, one or more frequency bands, instruction to increase or decrease frequency bandwidth, and instruction to increase or decrease frequency bandwidth by a predefined amount.

Therefore, a second network node 300 may be configured or instructed with the exact amount and location in the frequency domain of the frequency resources to utilize to communicate with the system user devices. In alternative, a second network node 300 may be instructed to increase or decrease the amount of frequency bandwidth utilized within one or more frequency bands. In this case, the second network node 300 may either autonomously determine an increase or decrease factor and its frequency location, respectively, (for instance, by utilizing pre-defined tables) or it may further be instructed with an increase or decrease factor and its frequency location. In one example, the increase or decrease factor may be chosen among a set of step-sizes known at the second network node.

FIG. 5 illustrates further that one or more parameters P1, P2, ..., Pn may be used as input parameters in an algorithm for determining the first allocation of frequency resources for operation $W_1$ the density of network nodes for operation $\lambda_b$ and the frequency spectrum access price. The parameters P1, P2, ..., Pn may be seen as representations of the network information comprised in the first signal S1. The parameters P1, P2, ..., Pn can be used as input parameters in algorithms executed in the processor 102 for determining content of the first network resource allocation message NRAM1 in the second signal S2.

Therefore, the network information received by the processor 102 and processed by the processor 102 comprises according to an embodiment network traffic information or network environmental information of one or more in the group:

Traffic load,
Traffic demand,
Average traffic load or traffic demand,
Peak traffic load or traffic demand time distribution of traffic load or traffic demand,
Spatial distribution of traffic load or traffic demand,
User device 600 density, active user device 600 density, traffic demand of active user devices 600a, 600b, ..., 600n,
Available density of network nodes,
Available frequency spectrum resources, and
An estimate of a radio propagation loss exponent.

Traffic load and traffic demand represent the amount of data to be supplied to and requested by the user devices (e.g. in a region R controlled or supervised by the first network node 100), respectively. Typically, these parameters are expressed in [bit/sec]. However, when referred to a traffic map, the intensity of these can be given per unit area, such as [bit/sec/km$^2$]. The average traffic load or traffic demand may represent an average over time, over space or a combination thereof. Similarly, peak traffic load or peak traffic demand may represent a maximum or a maximum of an average over time, over space or a combination thereof. The spatial distribution of traffic load or traffic demand represents the spatial correlation of the parameters. The density of user devices gives the number of user devices per unit area, whilst the available density of network nodes represents the number of network nodes deployed per unit area in the wireless communication system. The available frequency resources can represent the frequency bands that the network nodes can operate with, the amount of frequency bandwidth per frequency band available at the network nodes, the number of component carriers, radio access technologies (RATS) available at the network nodes. Overall, this parameter can be expressed in terms of a frequency spectrum budged representing the overall frequency bandwidth available at network nodes. Also, an estimate of a radio propagation loss exponent, also known as path-loss exponent, represents the distance dependent attenuation factor for a given region or sub-region of the wireless communication system. Typical values of the propagation loss exponent are: 2 in free-space wireless communication; 3.76 for rural environment; and above 4 urban areas or indoor environments. Finally, radio access technologies available at network nodes and transmission power available at network nodes can also be used by the first network node 100 to determine the first network resource allocation message NRAM1.

In an embodiment of the present invention, the network information comprises network resource utilization information of one or more in the group comprising: utilized frequency spectrum bandwidth, utilized frequency spectrum resources, an indication of scheduled network node density, an indication of interference associated to the available or utilized frequency resources, an indication of the operational cost per network nodes or per frequency spectrum unit, an indication of the energy cost per network nodes or per frequency spectrum unit, and indication or a preference of the resource costs to be minimized. The network resource utilization information is associated with a network operator and is transmitted to the first network node 100 as network information in the first signal S1.

In an embodiment of the present invention, the network information comprises network identification information of one or more in the group comprising: network identifier, network role indication, spectrum management capabilities, network node capabilities, etiquette protocol capabilities, and etiquette protocol identifier, version or name, etc. The network identification information is associated with a network operator and transmitted to the first network node 100 as network information in the first signal S1.

In an embodiment of the present invention, the network information comprises network resource request information of one or more in the group comprising: a request of frequency resources for operation $W_R$, a request of frequency spectrum bandwidth, one or more requested frequency bands, and a requested density of network nodes for operation $\lambda_R$. The network resource request information is associated with a network operator and is transmitted to the first network node 100 as network information in the first signal S1.

Figure 6:
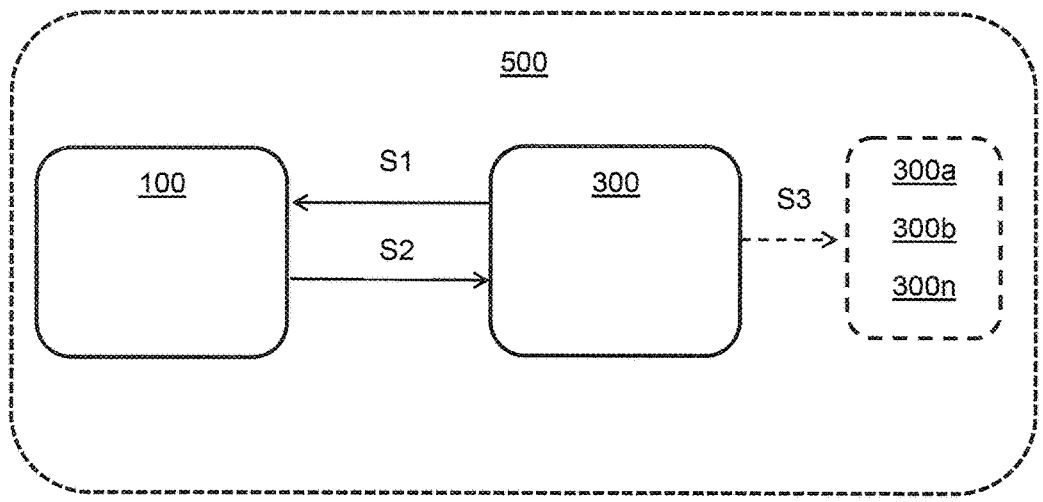
FIG. 6 illustrates information exchange between the first network node and the second network node.

Moreover, FIG. 6 illustrates possible information exchange between the first network node 100 and the second network node 300 and possibly other second network nodes 300a, 300b, ..., 300n in a wireless communication system 500 by suitable signalling. The second network node 300 transmits the first signal S1 to the first network node 100. The first network node 100 receives the first signal S1, processes the first signal S1 and derives the network information in the first signal S1. Thereafter, the first network node 100 transmits a second signal S2 comprising a first network resource allocation message NRAM1 to the second network node 300 and the second network node 300 uses the first network resource allocation message NRAM1 in the second signal S2 for deriving the allocation of frequency resources for operation $W_1$ which is used for controlling the second network node 300. It should however be noted the first signal S1 and the second signal S2 may be transmitted to the first network node 100 or to the second network node 300 by other network devices or entities, or via other network devices or entities in the wireless communication system 500.

FIG. 6 further illustrates optional signalling between the second network node 300 and one or more other second network nodes 300a, 300b, ..., 300n according to an embodiment of the present invention. It is noted that the second network node 300 transmits a third signal S3 to the other second network nodes 300a, 300b, ..., 300n. The third signal S3 comprises a second network resource allocation message NRAM2 indicating the operational state for the one or more second network nodes 300a, 300b, ..., 300n and/or the first allocation of frequency resources for operation $W_1$.

It shall be mentioned that the first signal S1 can be transmitted by several second network nodes 300 to the first network node 100 (acting as a supervising node).

FIGS. 7(a) and 7(b) illustrates examples of further embodiments of the present invention.

In FIG. 7(a), the first network node 100 represents a spectrum manager coordinating or determining an allocation of frequency resources for operation $W_1$ and a density of network nodes for operation $\lambda_b$ or a frequency spectrum access prince for multiple network operators with co-located network deployment in a geographical region of a wireless communication system 500. In this example, the first network node 100 transmits a second signal S2 to a second network node 300 of a first network operator NO1 and to a second network node 300 of a second network operator NO2. The second signal S2 comprises a first network resource allocation message NRAM1 indicating the first allocation of frequency resources for operation $W_1$ and the density of network nodes for operation $\lambda_b$ or the frequency spectrum access prince. Therefore, the allocation of network resources for the operation of a network operator, such as frequency resources or the density of network nodes, is received by the second network nodes 300. The second network node 300 can therefore be configured to operate according to the received allocation of frequency resources or the density of network nodes for operation) $\lambda_b$. In another case, the second network node can be configured to control the operation of one or more other second network nodes (in the example referred as NN-NO1 (network nodes of the first network operator NO1) and NN-NO2 (network nodes of the second network operator NO2) of the network operator based on the received allocation of frequency resources or the density of network nodes for operation $\lambda_b$. In one example, the operational state of the second network node 300 can be controlled with the received allocation of frequency resources or network resources. In another example, the second network node 300 can control the operational state of one or more other second network nodes 300a, 300b, ..., 300n based on the received allocation of frequency resources or the density of network nodes for operation $\lambda_b$. In the example illustrated in FIG. 7(a), the second network node 300 controls an ON/OFF operational state of one or more other second network nodes of the network operator, with some second network nodes 300a operate in an ON-state, and other second network nodes 300b operate in an OFF-state. Furthermore, it can be seen that a second network node 300 is dedicated to or associated to a network operator. Second network nodes 300 of different network nodes may communicate with each other. The example in FIG. 7(a) illustrates how the available frequency resources are assigned to the two network operators by the first network node 100. As already indicated such allocation may change over the time in dependence on several parameters (such as the above mentioned parameters P1 ... PN).

In FIG. 7(b) a first network node 100 is a network control node of a first network operator NO1 that coordinates or competes for the allocation of radio resources with the other network control nodes of other second network operator NO2 sharing a common pool of frequency resources. In this example, the first network node 100 of the first network operator NO1 receives a network information message associated with the second network operator NO2 indicating the utilized frequency spectrum resources, such as the utilized frequency spectrum bandwidth, the utilized frequency bands, etc. by the network nodes of the second network operator. Based on this information, the first network node 100 determines an allocation of frequency resources for operation $W_1$ or a density of network nodes for operation $\lambda_b$ for the first network operator NO1. This may include, for instance, a set of time-frequency resource blocks, the frequency bandwidth and its location in the frequency domain to be used by radio access nodes for their operation, as well as an operational state of radio access nodes of the network operator, such as an ON-state or an OFF-state based on the determined density of network nodes for operation $\lambda_b$.

Any of the aforementioned information may further be associated to a particular region of the wireless communication system 500. Therefore, in association to different geographical regions, a second network node 300 of a network operator may transmit to the first network node 100 a signal comprising a network information message indicating network information associated to the network operator, such as network traffic information, network environment information, network identification information, network resource request information, network resource demand, and network resource utilization cost.

In one embodiment of the invention, the first network node 100 determines an exclusive allocation of frequency spectrum bandwidth $W_n$ and a density of network nodes $\lambda_{n,b}$ for at least a network operator having indices n=1, ..., N (therefore the sub-indices n in $W_n$ and in the lambda expression). The network nodes density $\lambda_{n,b}$ and the frequency spectrum bandwidth $W_n$ allocated to second network nodes 300a, 300b, ..., 300n of a network operator n=1, ..., N can be determined by minimizing a cost function $\sum_{i=1}^{N} c_{n,b}\lambda_{n,b} + c_{n,w}W_n$ subject to traffic demand constraints associated to each network operator by solving the following optimization problem in the variables $\lambda_{n,b}$ and $W_n$ $$\text{minimize} \sum_{n=1}^{N} c_{n,b}\lambda_{n,b} + c_{n,w}W_n \qquad (1)$$

subject to $$t_{n,m}\lambda_{n,m} \le \lambda_{n,b}W_n \log\left(1 + \left(\frac{\lambda_{n,b}}{\rho_n\lambda_{n,m}}\right)^{\alpha_n/2}\right) n = 1, \ldots N$$

$$\sum_{n=1}^{N} W_n \le W$$

$$0 \le \lambda_{n,b} \le \lambda_{n,dep}, 0 \le W_n \le W \; i = 1, \ldots N$$

The left hand size of the first inequality constraint, $t_{n,m}\lambda_{n,m}$, represents the product of the expected peak or average traffic per active users and the density of active users served by the network operator having indices n=1, ..., N, while the right hand side represents the achievable peak or average offered throughput, where the term $$\log\left(1 + \left(\frac{\lambda_{n,b}}{\rho_n \lambda_{n,m}}\right)^{\alpha_n/2}\right) \quad (5)$$

represents an estimate of the peak or average user spectral efficiency of a network operator n expressed as a function of the scheduled density of network nodes $\lambda_{n,m}$ for operation, the density of served users $\lambda_{n,m}$, an estimated of the propagation loss $\alpha_n$, and a scaling factor $\rho_n \in \Re$ that may represent a spectral efficiency loss due, for instance, to interference.

Figure 8:
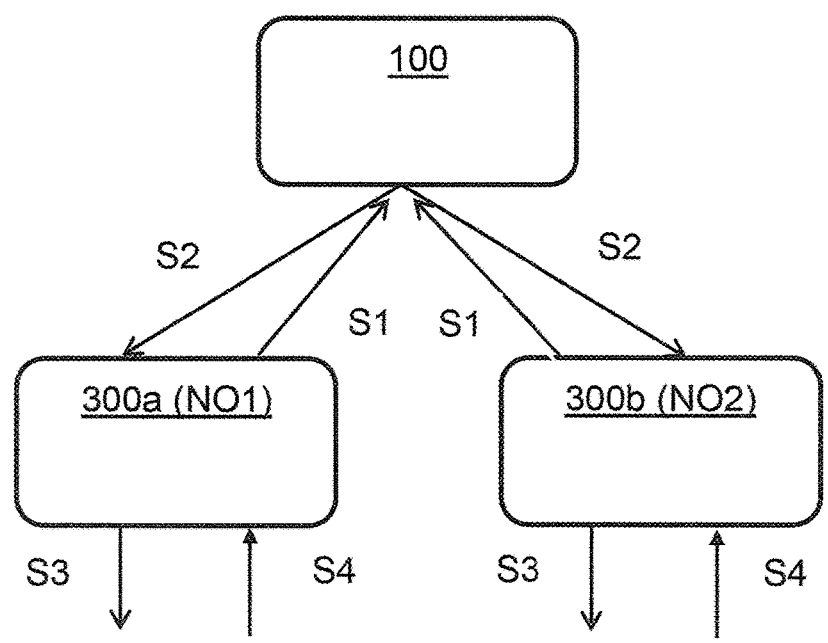
FIG. 8 illustrates a centralized solution according to an embodiment of the present invention.

Therefore, in this centralized solution a first network node 100 receives a first signal S1 comprising information associated with different network operators and determines an allocation of frequency resources for operation and a density of network nodes for operation for the one or more network operators. The first network node 100 transmits a second signal S2 to a second network node 300 associated with a network operator comprising a first network resource allocation message NRAM1 indicating the corresponding allocation of frequency resources for operation $W_n$ and the density of network nodes for operation $\lambda_{n,b}$ as illustrated in FIG. 8. The second network node 300 of this solution is a network control node associated to a network operator which can further control the operation of the wireless communication system of the corresponding network operator based on the received first network resource allocation message NRAM1. This may include configuring the associated network nodes to operate according to the allocation of frequency resources for operation indicated in the first network resource allocation message NRAM1, and/or determining an operational state of one or more other second network nodes of the network operator based on the received network resource allocation message NRAM1.

Figure 7:
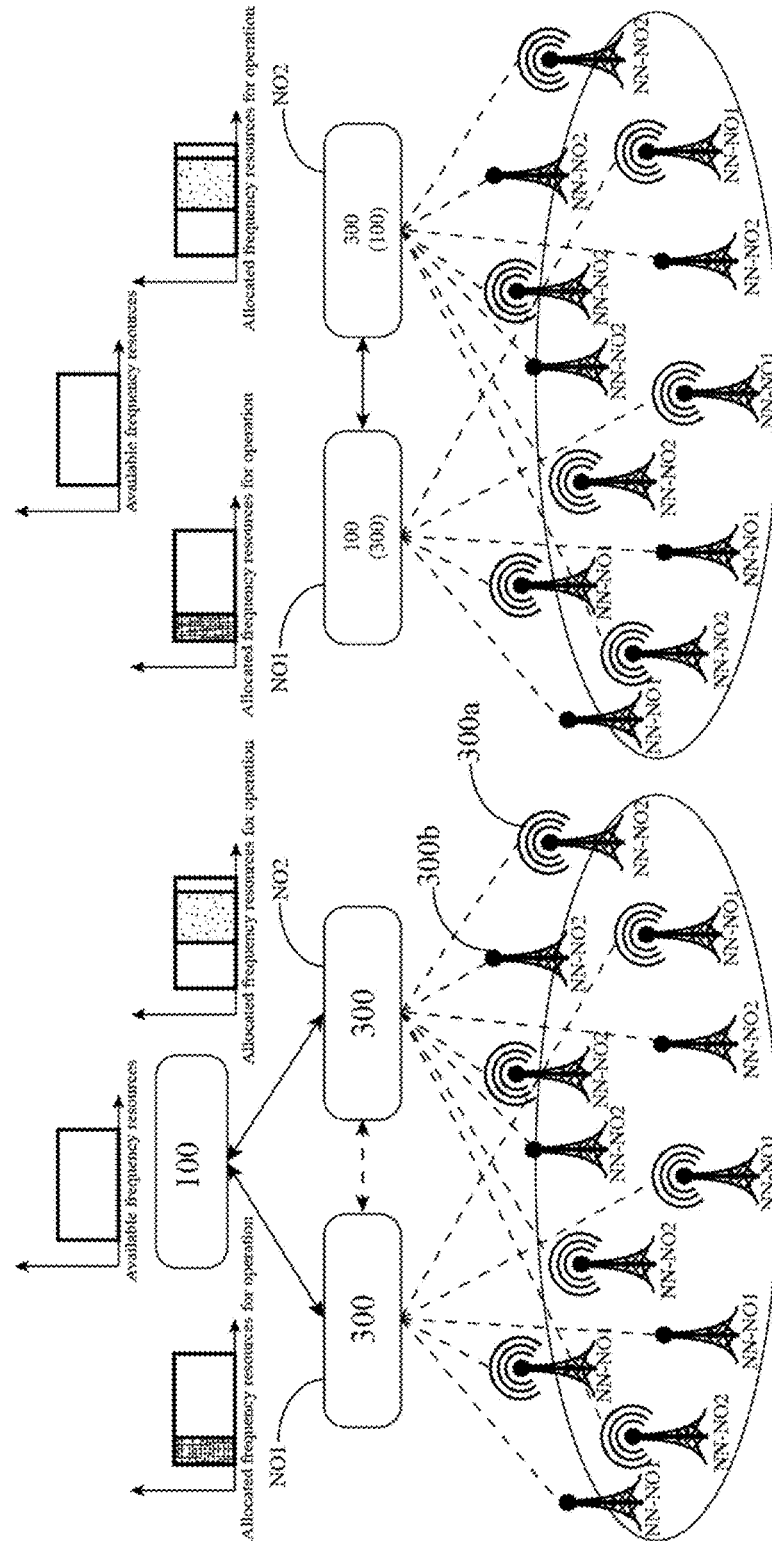
FIGS. 7(a) and 7(b) illustrates examples of embodiments of the present invention.

In FIG. 8 the first network node 100 can represent a spectrum manager, while the second network nodes 300a of a first network operator (NO1) and 300b of a second network operator (NO2), respectively, can represent network control nodes for a region of a wireless communication system 500 of a network operator, e.g., a Radio Network Controller (RNC), a Mobility Management Entity (MME), an Operation And Maintenance (OAM) node, etc. Furthermore, the second network node 300a and 300b can be tasked to further determine or control the operational state and the utilized frequency resources of other (downstream) second network nodes (not shown in FIG. 8), such as radio access nodes (e.g. NN-NO1 and NN-NO2 as shown in FIG. 7). To this end, the second network node 300a and/or 300b, transmits a third signal S3 to other second network nodes comprising a network resource allocation message indicating the operational state for the one or more second network nodes and the an allocation of frequency resources for operation. Signals S4 illustrates signalling from the other second network nodes. Signals S4 may e.g. comprise additional network traffic information or network environment information which the second network node 300a and 300b can use for network resource allocation and/or forward to the first network node 100 in signal S1 for further processing.

In a further embodiment of the present invention, the first network node 100 determines a non-exclusive allocation of frequency spectrum bandwidth $W_n$ and the density of network nodes $\lambda_{n,b}$ for operation for at least a network operator having indices n=1, . . . , N. The scheduled density of network nodes $\lambda_{n,b}$ for operation and the frequency spectrum bandwidth $W_n$ allocated to network nodes of a network operator n=1, . . . , N can be determined by solving a modified version of problem (1), i.e.:

$$\text{minimize} \sum_{n=1}^{N} c_{n,b} \lambda_{n,b} + c_{n,w} W_n \quad (2)$$

subject to $$t_{n,m} \lambda_{n,m} \le \lambda_{n,b} W_n \log\left(1 + \left(\frac{\lambda_{n,b}}{\rho_n \lambda_{n,m}}\right)^{\alpha_n/2}\right) n = 1, \ldots N$$

$$0 \le \lambda_{n,b} \le \lambda_{n,dep}, 0 \le W_n \le W \; i = 1, \ldots N$$

Compared to the case of exclusive spectrum allocation, the scaling factor $\rho_n$ shall take into account the interference experienced by each network operator in portions of spectrum that are shared with other co-located network operators in non-exclusive manner. For instance, the method may consider $\rho_n = \rho_{n,0} + \rho_{n,1}$ where $\rho_{n,0}$ denotes the scaling factor for the case of exclusive spectrum allocation and $\rho_{n,1}$ represents an additional spectral efficiency loss due to co-located network operators using the same frequency resources. Thus, $\rho_{n,1}$ can account for inter-operator interference or coupling loss and could be estimated through methods for estimating interference and usage of spectrum among co-located or adjacent network operators. In alternative, the inter-operator interference with non-exclusive spectrum allocation could be model explicitly in the spectrum allocation problem.

In another embodiment of the present invention, the first network node 100 determines an allocation of frequency resources for operation $W_n$ and an indication of spectrum access price through the following steps:

Receiving, from at least a second network node 300 of a network operator, a network resource request information in a first signal S1 comprising requested frequency resources for operation $W_R$;

Determining, based on received network resource request information, an allocation of frequency resources for operation for at least one network operator and an indication of frequency spectrum access price;

Transmitting to a second network node 300 (e.g. the one which sent the network resource request information) associated with a network operator a second signal S2 comprising a network resource allocation message indicating the allocation of frequency resources of operation $W_n$ and the frequency spectrum access price.

In particular, the network resource request information may comprise a request of frequency resources for operation, a request of frequency spectrum bandwidth, one or more requested frequency bands, and a requested density of network nodes for operation.

Additionally, the embodiment further comprises a second network node 300 associated with a network operator having indices n=1, . . . , N being configured to:

Receiving, from a first network node 100, a second signal S2 comprising a network resource allocation message indicating the allocation of frequency resources of operation $W_n$ and the frequency spectrum access price;

Determining, based on the received network resource allocation message and other network information such as traffic demand, traffic load, user mobility, etc., a new request of frequency resources for operation, such as requested frequency spectrum bandwidth, and a scheduled density of network nodes $\lambda_{n,b}$;

Transmitting a first signal S1 to the first network node indicating the utilized or requested frequency spectrum bandwidth or an indication of the scheduled density of network nodes for operation to the first network node 100 or said allocation of at least a frequency spectrum band to at least one other second network node.

Figure 9:
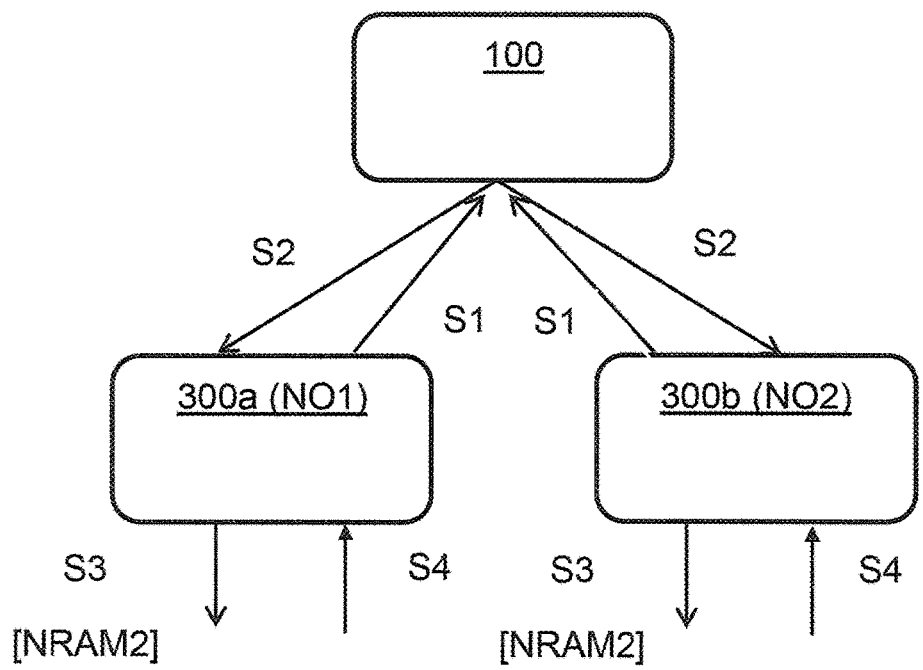
FIG. 9 illustrates a semi-distributed solution according to an embodiment of the present invention.

The steps described in this embodiment realize a semi-distributed optimal solution to the radio resource management problem (1) as illustrated in FIG. 9. In this case, the first network node 100 (e.g., a spectrum manager node) determines and transmits a second signal S2 comprising an allocation of frequency resources for operation $W_n$ for at least one network operator and an indication of frequency spectrum access price. The allocation of frequency resource for operation $W_n$ is based on network resource request information from one or more network operators such as requested frequency spectrum bandwidth. The second network node 300a and 300b of a first network operator (NO1) and a second network operator (NO2), respectively, can configure or control other second network nodes (not shown in FIG. 9) of the corresponding wireless communication system to operate according to the received allocation of frequency resource for operation $W_n$. This is enabled by transmitting a third signal S3 from the second network node 300a and 300b to the other second network nodes of their respective network operator NO1 and NO2 as shown in FIG. 9. A density of network nodes for operation $\lambda_{n,b}$ and an operational state for the other second network nodes can be determined, by the second network node 300a and 300b based on additional network information and the first network resource allocation message NRAM1 and the density of network nodes for operation $\lambda_{n,b}$ received from the first network node 100.

The additional network information may be comprised in a fourth signal S4 received by the second network node 300a and 300b as shown in FIG. 9. Hence, the additional network information is associated with their respective network operator and can be used to determine an allocation of network resources for the corresponding network operator and/or be forwarded to the first network node 100 in the first signal S1. Therefore, FIG. 9 shows how the second network node 300a and 300b is configured to receive fourth signals S4 comprising the additional network information message indicating additional network information associated with a network operator.

In one example, the second network node 300 of a network operator n further exploits the received frequency spectrum access prices, along with proprietary network information associated to the network operator (e.g., network operational costs, energy costs, etc.), to determine a new request of frequency resources for operation, as well as determine a new the density of network nodes for operation $\lambda_{n,b}$ so as to adapt to changes in the traffic demand, traffic load, user mobility, etc, in different regions of the wireless communication system 500. The second network node 300 of a network operator n can further be configured to determine an operational state for the second network node 300 or one or more other second network nodes based on the first network resource allocation message NRAM1 and the density of network nodes for operation $\lambda_{n,b}$. In this case, the transceiver 304 further is configured to transmit a third signal S3 to the one or more other second network nodes comprising a second network resource allocation message NRAM2 indicating the operational state for the one or more other second network nodes 300a, 300b, . . . , 300n and the allocation of frequency resources for operation $W_n$. This case is also illustrated in FIG. 9. in which the transmission of the third signal S3 comprising the second network resource allocation message NRAM2 indicating the operational state for the one or more other second network nodes and/or the first allocation of frequency resources for operation $W_1$ is shown.

In one implementation of this embodiment, the second network node 300 associated with a network operator n determines an optimal request of frequency resources for operation in the form of requested frequency bandwidth $W_R$ (where $W_n$ denotes the requested frequency bandwidth for network operator n=1, . . . , N), and an optimal density of network nodes for operation $\lambda_{n,b}$ through the following iterative algorithm (where i denotes the $i^{th}$ iteration of the algorithm, and $\in$ is a suitably small step-size):

Given the current frequency spectrum access price $\omega(i)$ =$\omega$, determine:

$$\lambda_{n,b}(i) = \min\left\{\lambda_{n,dep},\right.$$

$$\left.\frac{\mu_n(i-1)}{c_{n,b}}\left[1 + \frac{\alpha_n}{2}\frac{\left(\frac{\lambda_{n,b}(i-1)}{\rho_n\lambda_{n,m}}\right)^{\alpha_n/2}}{1+\left(\frac{\lambda_{n,b}(i-1)}{\rho_n\lambda_{n,m}}\right)^{\alpha_n/2}}\frac{1}{\log\left(1+\left(\frac{\lambda_{n,b}(i-1)}{\rho_n\lambda_{n,m}}\right)^{\alpha_n/2}\right)}\right]\right\}$$

$$W_n(i) = \min\left\{W, \frac{\mu_n(i-1)}{c_{n,w}+\omega/\sum_{j=1}^N W_j(i-1)}\right\}$$

and the auxiliary variable $\mu_n$ according to $$\mu_n(i+1) = \max\left\{0, \mu_n(i) + \in\left[\log(t_{n,m}\lambda_{n,m}) - \log\left(\lambda_{n,b}(i)W_n(i)\log\left(1+\left(\frac{\lambda_{n,b}(i)}{\rho_n\lambda_{n,m}}\right)^{\alpha_n/2}\right)\right)\right]\right\}$$

The iterations can be repeated until convergence, at which point the new values of the requested frequency bandwidth $W_n$ is transmitted to the first network node 100.

In one implementation of this embodiment, the first network node 100, upon receiving requests of frequency resources for operation $W_R$ in the form of requested frequency bandwidth $W_n$ for network operator n=1, . . . , N, determines a new allocation of frequency resources for each network operator and an updated spectrum access price $\omega$ according to:

$$\omega(i+1)=\max\{0,\omega(i)+\in[\log(\Sigma_{j=1}^N W_j(i)-\log(W)]\}$$

Hence, the first network node 100 transmits the new allocation of frequency spectrum resources or the new spectrum access price $\omega$ to at least a network operator (e.g. a second network node 300 of such network operator). In addition to this, the first network node 100 may transmit an indication of the overall spectrum utilization $\Sigma_{j=1}^N W_j(i)$.

Figure 10:
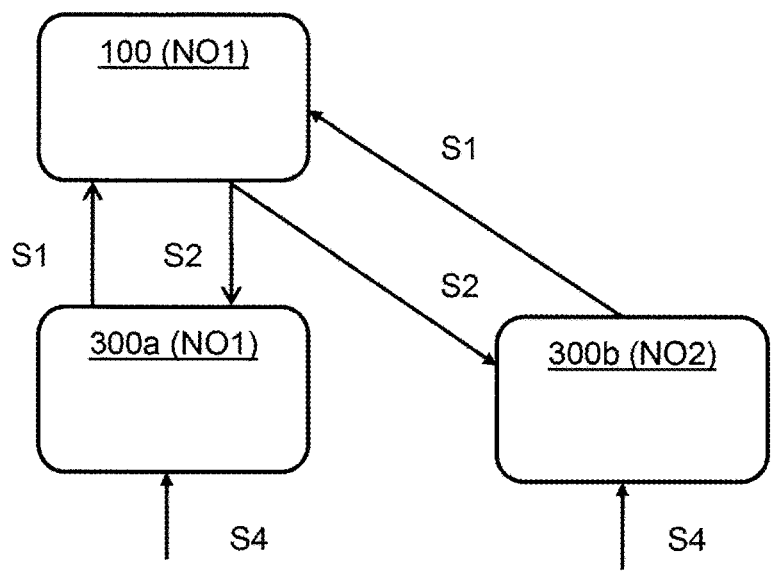
FIG. 10 illustrates a distributed solution according to an embodiment of the present invention.

According to a further embodiment of the present invention a fully distributed solution to the frequency resource allocation and network density scheduling problem (1), as illustrated in FIG. 10, is considered.

With reference to FIG. 10 the first network node 100 of a first network operator NO1 is configured to:

Receive a first signal S1 comprising network information from a second network node 300a associated with the first network operator NO1 and/or receive a first signal S1 comprising network information from a second network node 300b associated with a second network operator NO2. The network information may comprise e.g. network traffic information, network environment information, network identification information, network resource request information, network resource demand, network resource utilization, and network resource utilization cost, as described in other embodiments;

Determine, based on the above received network information, one or more in the group of: an allocation of frequency spectrum resources $W_n$, a density of network nodes $\lambda_{n,b}$ operation, one or more indication of spectrum access price, and an operational state for one or more other second network nodes of the first network operator NO1; and Transmit a second signal S2 to the second network node 300a of the first network operator NO1 and/or to the second network node 300b of the second network operator NO2. The second signal S2 comprises a resource allocation message indicating an allocation of frequency resources for operation and/or operational state for the second network node 300a of the first network operator NO1.

The above algorithm refers to the case of exclusive spectrum allocation. In particular, the second network node 300b of the second network operator NO2 can transmit network resource utilization information or network resource request information indicating, for example the utilized or requested frequency spectrum bandwidth, the utilized frequency band(s), a spectrum resource access price, etc. For non-exclusive spectrum allocation, the additional spectrum access price w can be set to zero and not updated.

FIG. 10 further shows that additional network information may be comprised in a fourth signal S4 received by the second network node 300a and 300b. Hence, the additional network information is associated with the first NO1 or the second NO2 network operator and can be used to determine an allocation of resources for the corresponding network operator and/or be forwarded to the first network node 100. Therefore, FIG. 10 shows how the second network node 300a and 300b is configured to receive fourth signals S4 comprising the additional network information message indicating additional network information associated with the corresponding network operator NO1 and NO2.

The solution in FIG. 10 illustrates the steps of a first network node of a first network operator NO1 which determines one or more in the group of: an allocation of frequency spectrum resources $W_n$, a density of network nodes $\lambda_{n,b}$ operation, one or more indication of spectrum access price, and an operational state for one or more other second network nodes of the first network operator NO1. Therefore, this solution is fully distributed among different first network nodes of different network operators implying that the first network node of a network operator is treated by another network operator as a second network node of a second network operator NO2 (and vice versa).

Figure 11:
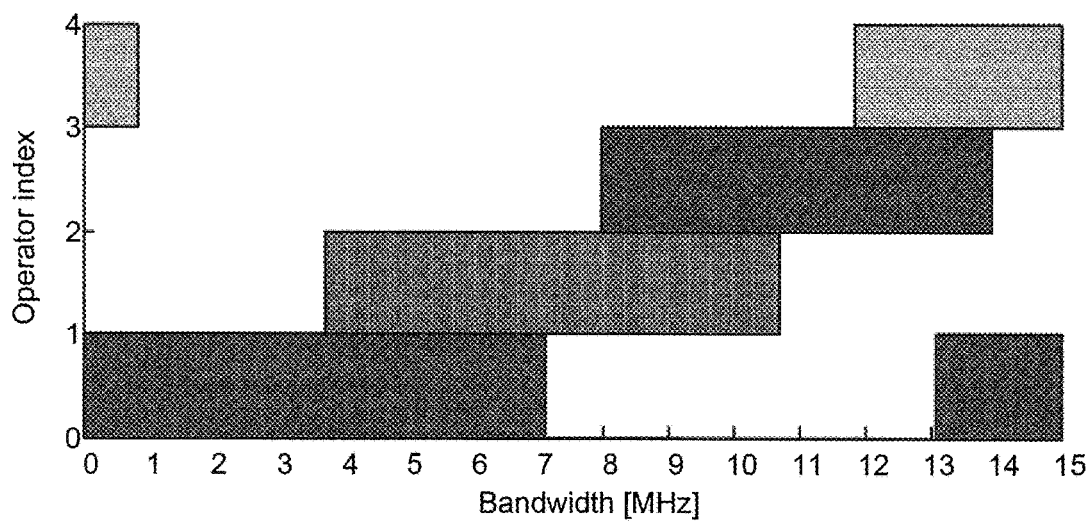
FIG. 11 illustrates non-exclusive resource allocation according to an embodiment of the present invention.
Figure 12A:
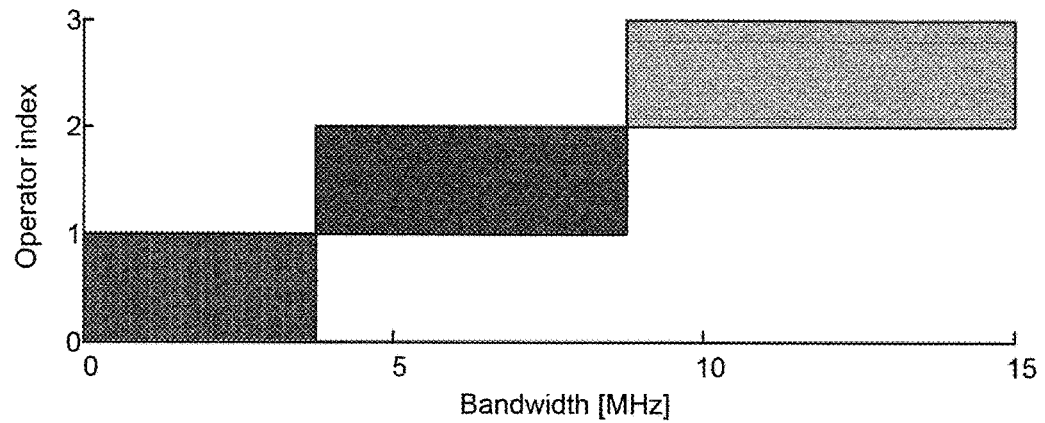
FIGS. 12(a) and 12(b) illustrates exclusive resource allocation according to an embodiment of the present invention.
Figure 12B:
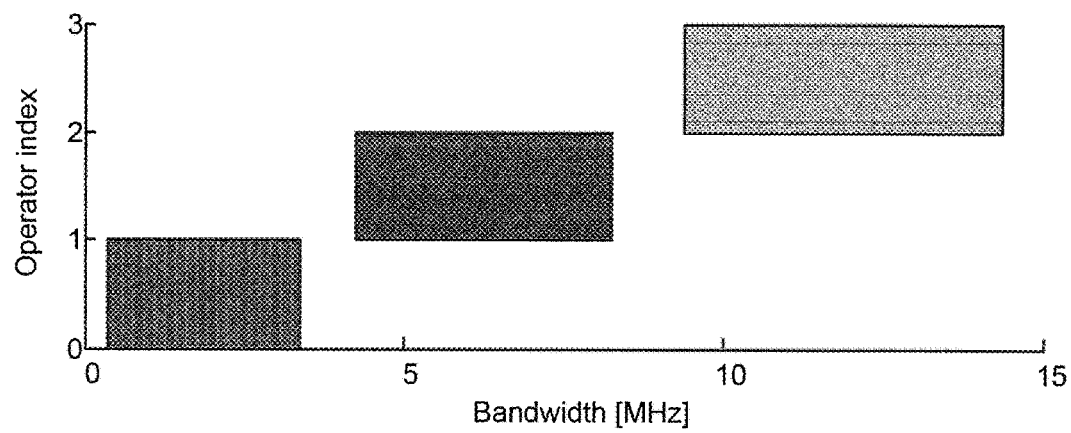

Further, upon receiving information associated with the utilized or requested frequency resources of a second network operator, the first network node 100 associated with the first network operator NO1 can determine the corresponding allocation of frequency resources for operation $W_n$ and the density of network nodes $\lambda_{n,b}$ for operation of the first network operator NO1. The allocation of frequency resources for operation may comprise frequency spectrum bandwidth, frequency spectrum bands, a set of time-frequency resources for operation of the network access nodes in the wireless communication system 500. The exact allocation of frequency resources for operation can be determined following predefined algorithms common to the network operators sharing frequency resources as described in subsequent embodiments and as illustrated in FIGS. 11 and 12(a)-(b). To this end, the network information received by the first network node 100 may further comprise network identification information.

The advantage of this embodiment is to allow spectrum sharing among network operator avoiding the inter-exchange of confidential information that network operators typically do not desire to disclose, such as traffic load, traffic demand, user mobility patterns, etc. In particular, it is sufficient for network operators to exchange an indication of the required frequency bandwidth for a given region of the wireless communication system. An additional benefit of this embodiment is the reduction of signalling overhead and improved system security by avoiding the exchange of sensible proprietary information of network operators, such as information related to traffic demand, density of users, deployed network node density, operational costs, etc., is transmitted to a third party.

In one embodiment of the invention, the frequency resources for allocation and the density of network node for operation $\lambda_{n,b}$ or the indication of spectrum access price transmitted by the first network node 100 to at least one second network node 300 of a network operator are associated to a certain geographical region. Therefore, different geographical regions may have different allocation of network resources for a certain network operator depending on the corresponding traffic demand, traffic load, user mobility, deployed network nodes density, etc., as well as on similar information related to other network operator entities, and the inter-operator coupling losses and interference. The benefit of this embodiment is twofold: on one hand, it reduces the granularity of the measured quantities needed to optimize the frequency spectrum utilization, thereby resulting in a more accurate and efficient spectrum utilization; on the other hand, the amount of signalling is distributed among different regions of the system thereby reducing the complexity the dynamic spectrum allocation problem. In addition, this enables to adapt the network resource allocation in different areas at different time scales so as to follow the corresponding changes in traffic demand, traffic load, user mobility, etc.

In an embodiment of the invention, the first network node 100 determines an allocation of frequency resources for operation $W_n$ for at least one network operator. To this end, the network resource request information or the network resource utilization information received from at least a second network node 300 of one or more other network operators can be exploited to determine the exact location in the frequency domain of the set of frequency resources allocated to a network operator according to an "etiquette" operation protocol shared by multiple network operators. In its simplest implementation form an "etiquette" operation protocol may refer to an agreed predetermined order of the network operators where the allocation of the shared frequency resources is proportional and/or weighted (as agreed) to the order and/or the bandwidth request of the network operators.

In another implementation form an "etiquette" operation protocol requires a sorting function, $\zeta$, that defines an order among the operators, for instance, operators can be sorted in ascending or descending order of their requested bandwidth, $W_1, W_2, \ldots, W_N$. In this case, the sorting is a permutation (a reordering) of the values $W_1, W_2, \ldots, W_N$ (e.g., ascending or descending). The algorithm used for the computation of the exact allocation of resources and the sorting criteria and used by the sorting function, $\zeta(n)$, constitute a kind of an etiquette operation protocol. The output of the sorting function is used to further assign an operator to portions of the frequency pool. Ties are broken by applying multiple ordering criteria, for instance, frequency spectrum demand followed by identifier order. For example, for bandwidth requests of not equal size the first ordering criterion of the network operators may correspond to the ordering of their bandwidth requests on ascending order. For two bandwidth requests of equal size the second ordering criterion of the network operators may correspond, for example, to the ordering of their identifiers in alphanumerical ascending order.

In one implementation of this embodiment using etiquette communications protocol or etiquette operation protocol, the first network node 100 executes an etiquette operation protocol comprising:

Step-1: Assuming an etiquette protocol where network operators are ordered in ascending (or descending) order of their bandwidth requests, we let $W_n$ be the requested bandwidth of the $n^{th}$ operator, and let $\zeta$ be any permutation of the set $W_1, W_2, \ldots, W_N$ such that $$W_{\zeta(1)} \geq W_{\zeta(2)} \geq \ldots \geq W_{\zeta(N)}, \text{ (or } W_{\zeta(1)} \leq W_{\zeta(2)} \leq \ldots \leq W_{\zeta(N)})$$

Step-2: Following the order of the network operators as determined in step-1 one possible allocation of the spectrum interval $[\varphi_{\zeta(n)}^{begin}, \varphi_{\zeta(n)}^{end}]$ for the n th network operator can be determined as follows:

$$\varphi_{\zeta(n)}^{begin} = \varphi_{\zeta(n)}^{center} - \frac{W_{\zeta(n)}}{2}$$

$$\varphi_{\zeta(n)}^{end} = \varphi_{\zeta(n-1)}^{center} + \frac{W_{\zeta(n)}}{2}$$

where $$\varphi_{\zeta(n)}^{center} = \varphi_{\zeta(n-1)}^{end} + \frac{W \, W_{\zeta(n)}}{2 \sum_{j=1}^{N} W_j}$$

with $\varphi_{\zeta(0)}^{end}=0$. This step concludes with a wrap-around for those intervals exceeding the boundaries of the spectrum bandwidth i.e., $\varphi_{\zeta_n}^{begin}<0$ and $\varphi_{\zeta(n)}^{end}>W$ then spectrum intervals are adjusted by $\varphi_{\zeta(n)}^{begin}=W+\varphi_{\zeta(n)}^{begin}$ and $\varphi_{\zeta(n)}^{end}=\varphi_{\zeta(n)}^{end}-W$, respectively.

In general network operators are ordered as determined by the "etiquette protocol" e.g., in ascending or descending order of their frequency spectrum demand, predetermined order, numerical order based on network identification information, etc.

Additionally, the first network node 100 or the second network node 300 may, if not preconfigured, signal information to identify or agree on the etiquette communications protocol to be used for the allocation and occupation of spectrum by the first network node 100 and the second network node 300. An etiquette communications protocol defines a set of rules or procedures, etiquette and precedence applied for the allocation frequency resources for operation. When multiple rules or procedures are available, the available rules or procedures can be characterized by an identifier, a version, a name, or a combination thereof.

FIGS. 11, 12a and 12b illustrate an example of allocation of frequency resources for operation for three network operators resulting from the described etiquette protocol. In this example, an etiquette protocol exploits an ordering of in the allocation of frequency resources based on the amount of frequency resources (e.g., frequency bandwidth) needed by each network operator involved in the protocol. In FIGS. 11, 12a and 12b the network operators have been given indices from 1 to 4 in FIG. 11 and 1 to 3 in FIGS. 12a and 12b. The x-axis shows frequency bandwidth whilst the y-axis shows network operator indices.

FIG. 11 illustrates an example with non-exclusive allocation of frequency resources for operation for three network operators, where the allocation is determined upon sorting the network operators in descending order of demand for frequency resources. The allocation, according to previous embodiments of the invention, can refer to an instance of time or a region of the wireless communication system. In this example four network operators share a spectrum bandwidth of a size equal to 15 MHz. Their corresponding network nodes signal a spectrum request of 4, 6, 7 and 9 MHz.

FIG. 12a illustrates an example with exclusive allocation of frequency resources for operation for four network operators, where the allocation is determined upon sorting the network operators in ascending order of demand for frequency resources. Furthermore, in the case of exclusive spectrum allocation the first network node 100 and the second network node 300 may also indicate the usage and sharing of any residual or excessive spectrum. To this end, FIG. 12b illustrates two spectrum allocation scenarios with three network operators. FIG. 12a illustrates the case where the network operators share the spectrum that exceeds their aggregate spectrum request; and FIG. 12b illustrates the case where the network operators only occupy the spectrum according to their spectrum request.

FIGS. 12a and 12b shows examples of exclusive spectrum allocation at an instance of time as determined by a set of network nodes of different network operator entities that signal information related to a spectrum request. In this example three network operators share a spectrum bandwidth of a size equal to 15 MHz. Their corresponding network nodes signal a spectrum request of 3, 4 and 5 MHz. In case 12(a) the three network operators share the spectrum that exceeds their aggregate spectrum request. In case 12(b) the three network operators only occupies the spectrum according to their spectrum request.

Furthermore, any method according to the present invention may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the present first network node and second network node comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present invention is not limited to the embodiments described above, but also relates to and incorporates all embodiments within the scope of the appended independent claims.

What is claimed is:

1. A first network node for a wireless communication system, the first network node comprising
    a processor; and
    a transceiver;
    wherein the transceiver is configured to receive a first signal S1 comprising a network information message indicating network information associated with a first network operator in a region;
    wherein the processor is configured to:
        determine an allocation of frequency resources for operation $W_1$, for the first network operator or a second network operator in the region, based on the network information, and
        determine a density of network nodes for operation $\lambda_b$ or a frequency spectrum access price, for the first network operator or the second network operator, based on the network information; and
    wherein the transceiver is further configured to transmit a second signal S2 to one or more second network nodes of the first network operator or the second network operator, the second signal S2 comprising a first network resource allocation message indicating the allocation of frequency resources for operation $W_1$, and the density of network nodes for operation $\lambda_b$ or the frequency spectrum access price;
    wherein the processor is further configured to:
        determine an operational state for the one or more second network nodes based on the density of network nodes for operation $\lambda_b$; and
    wherein the first network resource allocation message further indicates the operational state for the one or more second network nodes.

2. The first network node according to claim 1, wherein the network information comprises one or more network traffic information or network environment information in the group comprising:
    traffic load, traffic demand, average traffic load or traffic demand, peak traffic load or traffic demand time distribution of traffic load or traffic demand, spatial distribution of traffic load or traffic demand, user device density, active user device density, traffic demand of active user devices, available density of network nodes, available frequency spectrum resources, and an estimate of a radio propagation loss exponent.

3. The first network node according to claim 1, wherein the network information comprises one or more network resource utilization information in the group comprising:
    utilized frequency spectrum bandwidth, utilized frequency spectrum resources, an indication of scheduled network node density, an indication of interference associated to available or utilized frequency resources, an indication of an operational cost per network nodes or per frequency spectrum unit, an indication of an energy cost per network nodes or per frequency spectrum unit, and an indication or a preference of resource costs to be minimized.

4. The first network node according to claim 1, wherein the network information comprises one or more network identification information in the group comprising:
    a network identifier, a network role indication, spectrum management capabilities, network node capabilities, etiquette protocol capabilities, and an etiquette protocol identifier.

5. The first network node according to claim 1, wherein the network information comprises one or more network resource request information in the group comprising:
    a request of frequency resources for operation $W_R$, a request of frequency spectrum bandwidth, one or more requested frequency bands, and a requested density of network nodes for operation $\lambda_R$.

6. The first network node according to claim 1, wherein the allocation of frequency resources for operation $W_1$ is associated with one or more in the group comprising:
    an amount of frequency bandwidth, a frequency location of frequency bandwidth, a set of time-frequency resource blocks, one or more frequency bands, an instruction to increase or decrease frequency bandwidth, and an instruction to increase or decrease frequency bandwidth by a predefined amount.

7. The first network node according to claim 1, wherein:
    the allocation of frequency resources for operation $W_1$ is exclusive for the first network operator; or
    the allocation of frequency resources for operation $W_1$ is non-exclusive for the first network operator.

8. A second network node for a wireless communication system, the second network node comprising
    a processor; and
    a transceiver;
    wherein the transceiver is configured to receive a second signal S2 from a first network node, the second signal S2 comprising a first network resource allocation message at least indicating an allocation of frequency resources for operation $W_1$;
    wherein the processor is configured to control the second network node based on the allocation of frequency resources for the operation $W_1$;
    wherein the transceiver is further configured to receive a fourth signal S4 comprising a network information message indicating network information associated with a first network operator;
    the processor is further configured to:
        determine a density of network nodes for operation $\lambda_b$ based on the network information, and
        determine an operational state, for the second network node or one or more other second network nodes, based on the first network resource allocation message and the density of network nodes for operation $\lambda_b$; and the transceiver is further configured to transmit a third signal S3 to the one or more other second network nodes, the third signal S3 comprising a second network resource allocation message indicating the operational state for the one or more other second network nodes and the first allocation of frequency resources for operation $W_1$.

9. The second network node according to claim 8, wherein:
the first network resource allocation message further indicates an operational state for one or more second network nodes; and
the processor is further configured to control the operational state of the second network node based on the operational state for the one or more second network nodes as indicated in the first network resource allocation message or based on the first allocation of frequency resources for operation $W_1$, or
the transceiver further is configured to transmit a third signal S3 to one or more other second network nodes, the third signal S3 comprising a second network resource allocation message indicating the operational state for the one or more second network nodes or the first allocation of frequency resources for operation $W_1$.

10. The second network node according to claim 8, wherein:
the first network resource allocation message further indicates a density of network nodes for operation $\lambda_b$; and
the processor further is configured to control the second network node based on the allocation of frequency resources for operation $W_1$ or the density of network nodes for operation $\lambda_b$.

11. The second network node according to claim 8, wherein:
the first network resource allocation message further indicates a spectrum access price;
the processor is further configured to determine a request of frequency resources for operation $W_R$ or a requested density of network nodes for operation $\lambda_R$ based on the spectrum access price; and
the transceiver is further configured to transmit a first signal S1 to the first network node, the first signal S1 comprising a network information message indicating the requested frequency resources for operation $W_R$ or the requested density of network nodes for operation $\lambda_R$.

12. The second network node according to claim 11, wherein the requested frequency resources for operation $W_R$ comprises one or more in the group comprising:
a requested frequency spectrum bandwidth, one or more requested frequency bands, and a set of requested time-frequency resource blocks.

13. The second network node according to claim 8, wherein the transceiver is further configured to:
transmit a first signal S1 to the first network node, the first signal S1 comprising a network information message indicating network information associated with a network operator of the wireless communication system.

14. A method, comprising:
receiving a first signal S1 comprising a network information message indicating network information associated with a first network operator in a region;
determining an allocation of frequency resources for operation $W_1$, for the first network operator or a second network operator in the region, based on the network information;
determining a density of network nodes for operation $\lambda_b$ or a frequency spectrum access price, for the first network operator or the second network operator, based on the network information;
transmitting a second signal S2 to one or more second network nodes of the first network operator or the second network operator, the second signal S2 comprising a first network resource allocation message indicating the allocation of frequency resources for operation $W_1$, and the density of network nodes for operation $\lambda_b$ or the frequency spectrum access price;
determining an operational state for the one or more second network nodes based on the density of network nodes for operation $\lambda_b$; and
wherein the first network resource allocation message further indicates the operational state for the one or more second network nodes.

15. A method, comprising:
receiving a second signal S2 from a first network node, the second signal S2 comprising a first network resource allocation message at least indicating an allocation of frequency resources for operation $W_1$; and
controlling the second network node based on the allocation of frequency resources for operation $W_1$;
receiving a fourth signal S4 comprising a network information message indicating network information associated with a first network operator;
determining a density of network nodes for operation $\lambda_b$ based on the network information, and
determining an operational state, for the second network node or one or more other second network nodes, based on the first network resource allocation message and the density of network nodes for operation $\lambda_b$; and
transmitting a third signal S3 to the one or more other second network nodes, the third signal S3 comprising a second network resource allocation message indicating the operational state for the one or more other second network nodes and the first allocation of frequency resources for operation $W_1$.

16. A non-transitory computer-readable medium storing instructions that, when executed by a processor, cause the processor to:
receive a first signal S1 comprising a network information message indicating network information associated with a first network operator in a region;
determine an allocation of frequency resources for operation $W_1$, for the first network operator or a second network operator in the region, based on the network information;
determine a density of network nodes for operation $\lambda_b$ or a frequency spectrum access price, for the first network operator or the second network operator, based on the network information;
transmit a second signal S2 to one or more second network nodes of the first network operator or the second network operator, the second signal S2 comprising a first network resource allocation message indicating the allocation of frequency resources for operation $W_1$, and the density of network nodes for operation $\lambda_b$ or the frequency spectrum access price;
determine an operational state for the one or more second network nodes based on the density of network nodes for operation $\lambda_b$; and wherein the first network resource allocation message further indicates the operational state for the one or more second network nodes.

* * * * *